United States Patent
Roy et al.

(10) Patent No.: US 12,406,139 B2
(45) Date of Patent: Sep. 2, 2025

(54) QUERY-FOCUSED EXTRACTIVE TEXT SUMMARIZATION OF TEXTUAL DATA

(71) Applicant: Optum, Inc., Minnetonka, MN (US)

(72) Inventors: Suman Roy, Bangalore (IN); Vijay Varma Malladi, Hyderabad (IN); Gaurav Ranjan, Bangalore (IN)

(73) Assignee: Optum, Inc., Minnetonka, MN (US)

( * ) Notice: Subject to any disclaimer, the term of this patent is extended or adjusted under 35 U.S.C. 154(b) by 401 days.

(21) Appl. No.: 17/405,555

(22) Filed: Aug. 18, 2021

(65) Prior Publication Data
US 2023/0054726 A1    Feb. 23, 2023

(51) Int. Cl.
*G06F 40/284* (2020.01)
*G06F 16/3329* (2025.01)
(Continued)

(52) U.S. Cl.
CPC ........ *G06F 40/284* (2020.01); *G06F 16/3329* (2019.01); *G06F 16/35* (2019.01);
(Continued)

(58) Field of Classification Search
None
See application file for complete search history.

(56) References Cited

U.S. PATENT DOCUMENTS 6,996,414 B2  2/2006  Vishwanathan et al.
7,318,031 B2  1/2008  Bantz et al.
(Continued)

FOREIGN PATENT DOCUMENTS

EP           3839850 A1   6/2021
KR    10-2022-0154592 A  11/2022

OTHER PUBLICATIONS

Notice of Allowance and Fee(s) Due for U.S. Appl. No. 17/122,607, dated Mar. 28, 2023, (8 pages), United States Patent and Trademark Office, US.

(Continued)

*Primary Examiner* — Jonathan C Kim
(74) *Attorney, Agent, or Firm* — Alston & Bird LLP

(57) ABSTRACT

Various embodiments provide methods, apparatus, systems, computing entities, and/or the like, for providing a summarization of a conversation, such as a telephonic conversation. In an embodiment, a method is provided. The method comprises receiving an input data object comprising textual data of a conversation, the textual data comprising sentence-level tokens. The method further comprises classifying some sentence-level tokens as interrogative sentence-level tokens, and identifying subtopic portions of the textual data, each interrogative sentence-level token located within one subtopic portion. The method further comprises determining whether an interrogative sentence-level token is substantially similar to one of a plurality of target queries, and for such interrogative sentence-level tokens, selecting sentence-level tokens from a subtopic portion corresponding to the such interrogative sentence-level tokens. The method then comprises generating a summarization data object comprising the selected sentence-level tokens for each interrogative sentence-level token substantially similar to a target query and performing summarization-based actions.

20 Claims, 10 Drawing Sheets

(51) Int. Cl.
*G06F 16/35* (2025.01)
*G06F 40/30* (2020.01)
*G06N 3/044* (2023.01)
*G06N 3/08* (2023.01)
*G10L 15/26* (2006.01)

(52) U.S. Cl.
CPC ............ *G06F 40/30* (2020.01); *G06N 3/044* (2023.01); *G06N 3/08* (2013.01); *G10L 15/26* (2013.01)

(56) References Cited

U.S. PATENT DOCUMENTS

| | | |
|---|---|---|
| 7,702,508 B2 | 4/2010 | Bennett |
| 7,849,147 B2 | 12/2010 | Rohall et al. |
| 7,865,560 B2 | 1/2011 | Rohall et al. |
| 7,886,012 B2 | 2/2011 | Bedi et al. |
| 8,750,489 B2 | 6/2014 | Park |
| 8,825,478 B2 | 9/2014 | Cox et al. |
| 8,914,452 B2 | 12/2014 | Boston et al. |
| 8,983,840 B2 | 3/2015 | Deshmukh et al. |
| 9,116,984 B2 | 8/2015 | Caldwell et al. |
| 9,118,759 B2 | 8/2015 | Krishnapuram et al. |
| 9,300,790 B2 | 3/2016 | Gainsboro et al. |
| 9,348,817 B2 * | 5/2016 | Bohra ................ G06F 40/35 |
| 9,413,877 B2 | 8/2016 | Aldrich et al. |
| 9,565,301 B2 * | 2/2017 | Lee .................... H04M 3/2218 |
| 10,009,464 B2 | 6/2018 | Slovacek |
| 10,051,122 B2 | 8/2018 | Raanani et al. |
| 10,204,158 B2 | 2/2019 | Hay et al. |
| 10,353,904 B2 | 7/2019 | Enders et al. |
| 10,354,677 B2 | 7/2019 | Mohamed et al. |
| 10,628,474 B2 | 4/2020 | Modani et al. |
| 10,637,898 B2 | 4/2020 | Cohen et al. |
| 10,659,585 B1 | 5/2020 | Graham et al. |
| 10,785,185 B2 | 9/2020 | Vennam et al. |
| 10,817,787 B1 | 10/2020 | Zhang |
| 11,018,885 B2 | 5/2021 | Niekrasz |
| 11,070,673 B2 | 7/2021 | Lemus et al. |
| 11,074,284 B2 * | 7/2021 | Cunico ................ G06F 16/38 |
| 11,115,353 B1 | 9/2021 | Crowley et al. |
| 11,228,681 B1 * | 1/2022 | Rosenberg .......... H04M 3/5175 |
| 11,232,266 B1 | 1/2022 | Biswas et al. |
| 11,262,978 B1 * | 3/2022 | Cohen .................. G06F 16/907 |
| 11,272,058 B2 | 3/2022 | Khafizov et al. |
| 11,315,569 B1 | 4/2022 | Talieh et al. |
| 11,487,797 B2 * | 11/2022 | Shukla ................ G06F 16/3349 |
| 11,500,951 B1 * | 11/2022 | Shetty .................. H04L 51/216 |
| 2009/0259642 A1 * | 10/2009 | Cao ........................ G06F 16/353 |
| 2010/0076978 A1 * | 3/2010 | Cong ...................... G06F 40/35 |
| | | 707/E17.069 |
| 2010/0088299 A1 | 4/2010 | O'Sullivan et al. |
| 2010/0287162 A1 * | 11/2010 | Shirwadkar .......... G06F 16/345 |
| | | 707/750 |
| 2012/0209590 A1 * | 8/2012 | Huerta .................... G06F 40/44 |
| | | 704/7 |
| 2013/0151533 A1 * | 6/2013 | Udupa ................ G06F 16/3325 |
| | | 707/742 |
| 2014/0032207 A1 | 1/2014 | Jin et al. |
| 2014/0200928 A1 | 7/2014 | Watanabe et al. |
| 2015/0154956 A1 | 6/2015 | Brown |
| 2015/0193429 A1 * | 7/2015 | Bohra .................. G06F 16/3329 |
| | | 704/9 |
| 2016/0196492 A1 | 7/2016 | Johnson et al. |
| 2016/0277577 A1 | 9/2016 | Yentis et al. |
| 2016/0350283 A1 * | 12/2016 | Carus .................... G06F 40/284 |
| 2017/0054837 A1 | 2/2017 | Choi et al. |
| 2017/0286867 A1 | 10/2017 | Bell et al. |
| 2018/0351887 A1 | 12/2018 | Efrati et al. |
| 2019/0042645 A1 * | 2/2019 | Othmer ................ G06Q 10/107 |
| 2019/0122142 A1 * | 4/2019 | Brunn ................... G06N 20/00 |
| 2019/0297186 A1 | 9/2019 | Karani |
| 2019/0340296 A1 * | 11/2019 | Cunico .................. G06F 16/38 |
| 2019/0373111 A1 | 12/2019 | Rute et al. |
| 2019/0386937 A1 * | 12/2019 | Kim ...................... G06F 40/268 |
| 2020/0074312 A1 | 3/2020 | Liang et al. |
| 2020/0137224 A1 | 4/2020 | Rakshit et al. |
| 2020/0184155 A1 * | 6/2020 | Galitsky ............... G06F 40/279 |
| 2020/0193095 A1 * | 6/2020 | Fan ........................ G06F 40/30 |
| 2020/0210521 A1 | 7/2020 | Hutchins |
| 2020/0218722 A1 | 7/2020 | Mai et al. |
| 2020/0227026 A1 * | 7/2020 | Rajagopal ............ G06F 16/244 |
| 2020/0311738 A1 * | 10/2020 | Gupta .................... G06F 16/22 |
| 2020/0311739 A1 * | 10/2020 | Chopra ................ G06Q 30/016 |
| | | 704/270.1 |
| 2020/0334419 A1 | 10/2020 | Raanani et al. |
| 2020/0401765 A1 * | 12/2020 | Ran ...................... G06F 40/289 |
| 2021/0034707 A1 * | 2/2021 | Podgorny ............. G06F 40/30 |
| 2021/0133251 A1 * | 5/2021 | Tiwari .................. G06F 40/205 |
| 2021/0182326 A1 | 6/2021 | Romano et al. |
| 2021/0182491 A1 * | 6/2021 | Chen .................... G06F 40/289 |
| 2021/0193135 A1 | 6/2021 | Gavai et al. |
| 2021/0248324 A1 | 8/2021 | Choudhary |
| 2021/0264897 A1 | 8/2021 | Churav et al. |
| 2021/0272040 A1 | 9/2021 | Johnson et al. |
| 2021/0303784 A1 * | 9/2021 | Brdiczka .............. G06F 40/284 |
| 2021/0304747 A1 | 9/2021 | Haas et al. |
| 2021/0334469 A1 * | 10/2021 | Feng .................... G06N 20/00 |
| 2021/0342554 A1 | 11/2021 | Martin et al. |
| 2021/0357588 A1 | 11/2021 | Friedrich et al. |
| 2021/0375289 A1 | 12/2021 | Zhu et al. |
| 2021/0390127 A1 * | 12/2021 | Fox ...................... G06F 16/335 |
| 2022/0004971 A1 * | 1/2022 | Kitamura .............. G06N 20/00 |
| 2022/0030110 A1 * | 1/2022 | Khafizov .............. H04M 3/2218 |
| 2022/0067269 A1 | 3/2022 | de Oliveira et al. |
| 2022/0068279 A1 * | 3/2022 | Embar .................. G06F 40/205 |
| 2022/0108086 A1 * | 4/2022 | Wu ........................ G06F 40/35 |
| 2022/0109585 A1 | 4/2022 | Asthana et al. |
| 2022/0138432 A1 * | 5/2022 | Galitsky ................ G06N 3/045 |
| | | 704/9 |
| 2022/0156464 A1 | 5/2022 | Norton et al. |
| 2022/0189484 A1 | 6/2022 | Malladi et al. |
| 2022/0215052 A1 * | 7/2022 | Chalana ................ G06F 16/739 |
| 2022/0277135 A1 * | 9/2022 | Kryscinski ............ G06F 16/345 |
| 2022/0337443 A1 | 10/2022 | Sood et al. |
| 2022/0391595 A1 * | 12/2022 | Shevelev ............... G06F 40/56 |
| 2022/0392434 A1 * | 12/2022 | Asi ........................ G10L 15/063 |
| 2022/0414338 A1 | 12/2022 | Cho et al. |
| 2023/0054726 A1 * | 2/2023 | Roy ...................... G06F 16/35 |
| 2023/0057760 A1 | 2/2023 | Galitsky |
| 2023/0122429 A1 * | 4/2023 | Gunasekara ......... G06N 3/08 |
| | | 705/304 |
| 2023/0315993 A1 | 10/2023 | Nieborowski et al. |
| 2023/0334072 A1 * | 10/2023 | Matsuzawa ......... G06F 16/3349 |
| 2023/0359657 A1 * | 11/2023 | Ganhotra ............. G06F 16/3329 |
| 2023/0385557 A1 * | 11/2023 | Sabapathy ........... G06F 16/345 |
| 2023/0419042 A1 | 12/2023 | Sabapathy et al. |
| 2023/0419051 A1 * | 12/2023 | Sabapathy ............ G06F 40/30 |
| 2025/0061277 A1 | 2/2025 | Zhu et al. |

OTHER PUBLICATIONS

Ma, Bing et al. "Extractive Dialogue Summarization Without Annotation Based On Distantly Supervised Machine Reading Comprehension In Customer Service," In IEEE/ACM Transactions on Audio, Speech, and Language Processing, vol. 30, pp. 87-97 Jan. 1, 2022, (Year: 2022).

Notice of Allowance and Fee(s) Due, for U.S. Appl. No. 17/815,817, dated Mar. 30, 2023, (12 pages), United States Patent and Trademark Office, US.

NonFinal Office Action for U.S. Appl. No. 17/122,607, dated Nov. 8, 2022, (58 pages), United States Patent and Trademark Office, US.

Vanetik, Natalia et al. "An Unsupervised Constrained Optimization Approach To Compressive Summarization," Information Sciences, vol. 509, Jan. 2020, pp. 22-35.

"Supercharge Your Call Notes—Automated Call Recording and Transcription, " Jog.Ai, (6 pages), (online), [Retrieved from the Internet Nov. 15, 2021] <URL: https://jog.ai/>.

"Trustworthy and Cutting Edge AI," The Blue, (12 pages), (online), [Retrieved from the Internet Nov. 12, 2021] <URL: https://theblue.ai/en/>.

(56) References Cited

OTHER PUBLICATIONS

Banerjee, Siddhartha et al. "Multi-Document Abstractive Summarization Using ILP Based Multi Sentence Compression," Proceedings of the Twenty-Fourth International Joint Conference On Artificial Intelligence (IJCAI 2015), pp. 1208-1214, Jun. 23, 2015.
Baumel, Tal et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).
Baumel, Tal et al. "Topic Concentration in Query-Focused Summarization," Proceedings of the Thirtieth AAAI Conference On Artificial Intelligence (AAAI-16), pp. 2573-2579, Mar. 5, 2016.
Canhasi, Ercan. "Ercan Canhasi: Query Focused Multi Document Summarization Based on the Multi Facility Location Problem," Computer Science On-Line Conference, Artificial Intelligence Trends In Intelligent Systems, CSOC 2017, Advances In Intelligent Systems and Computing, vol. 573, Springer, Cham., Apr. 7, 2017, pp. 210-219, DOI: 10.1007/978-3-319-57261-1_21.
Carbonell, Jaime et al. "The Use of MMR, Diversity-Based Reranking for Reordering Documents and Producing Summaries," In Proceedings of the 21st Annual International ACM SIGIR Conference on Research and Development In Information Retrieval, pp. 335-336, Aug. 1, 1998.
Devlin, Jacob et al. "BERT: Pre-Training of Deep Bidirectional Transformers for Language Understanding," Proceedings of NAACL-HLT 2019, Jun. 2, 2019, pp. 4171-4186.
Feigenblat, Guy et al. "Unsupervised Query-Focused Multi-Document Summarization Using The Cross Entropy Method," SIGIR '17: Proceedings of the 40th International ACM SIGIR Conference On Research and Development In Information Retrieval, Aug. 7, 2017, pp. 961-964, DOI: 10.1145/3077136.3080690.
Garg, Nikhil et al. "Clusterrank: A Graph Based Method For Meeting Summarization," Proceedings of the 10th International Conference of the International Speech Communication Association (Interspeech 2009), pp. 1499-1502, Sep. 6, 2009, Brighton, United Kingdom.
Goldstein, Jade et al. "Summarization: (1) Using MMR for Diversity-Based Reranking and (2) Evaluating Summaries," Carnegie-Mellon University, Language Technologies Institute, Tipster III Summarization Project, Oct. 1, 1998, pp. 181-195.
Gupta, Surabhi et al. "Measuring Importance and Query Relevance In Topic-Focused Multi-Document Summarization," 45th Annual Meeting of the Association for Computational Linguistics Demo and Poster Sessions, Jun. 2007, pp. 193-196.
Hearst, Marti A. "Text-Tiling: A Quantitative Approach To Discourse Segmentation," Association for Computational Linguistics 1993 (1993), pp. 1-10.
Kothadiya, Aditya. "Why We Built A Note Taking Software—A Tool That Automatically Takes Notes And Analyzes Sales and Customer Calls," Avoma Blog, (article, online), [Retrieved from the Internet Nov. 15, 2021] <https://www.avoma.com/blog/ai-note-taking-software>.
Mihalcea, Rada et al. "TextRank: Bringing Order Into Texts," Proceedings of the 2004 Conference on Empirical Methods in Natural Language Processing, Association for Computational Linguistics, Jul. 2004, pp. 404-411, Barcelona, Spain.
Radev, Dragomir R. et al. "Ranking Suspected Answers To Natural Language Questions Using Predictive Annotation," ANLC '00: Proceedings of the Sixth Conference On Applied Natural Language Processing, Apr. 29, 2000, pp. 150-157, https://doi.org/10.3115/974147.974168.
Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.
Singer, Eleanor et al. "Some Methodological Uses of Responses To Open Questions and Other Verbatim Comments In Quantitative Surveys," Methods, Data, Analyses: A Journal For Quantitative Methods and Survey Methodology (mda), vol. 11, No. 2, (2017), pp. 115-134, DOI: 10.12758/mda.2017.01.
Steinberger, Josef et al. "Evaluation Measures for Text Summarization," Computing and Informatics, vol. 28, Mar. 2, 2009, pp. 1001-1026.
Vanetik, Natalia et al. "Query-Based Summarization Using MDL Principle," Proceedings of the MultiLing 2017 Workshop On Summarization and Summary Evaluation Across Source Types and Genres, Association for Computational Linguistics, pp. 22-31, Apr. 3, 2017, Valencia, Spain.
Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.
Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.
Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.
Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.
Zweig, Geoffrey et al. "Automated Quality Monitoring For Call Centers Using Speech and NLP Technologies," Proceedings of the Human Language Technology Conference of the NAACL, Companion Volume, pp. 292-295, Jun. 2006.
Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.
Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.
Zhong, Junmei et al. "Predicting Customer Call Intent By Analyzing Phone Call Transcripts Based On CNN For Multi-Class Classification," Computer Science & Information Technology (CS & IT), pp. 9-20, arXiv preprint arXiv:1907.03715, Jul. 8, 2019, (12 pages), available online: https://arxiv.org/ftp/arxiv/papers/1907/1907.03715.pdf.
"Summarize Text With The Extractive Summarization API," Azure Cognitive Services|Microsoft Docs, Mar. 16, 2022, (6 pages) [Retrieved from the Internet May 4, 2022] <URL: https://docs.microsoft.com/en-us/azure/cognitive-services/language-service/text-summarization/how-to/call-api>.
Biswas, Pratik K. et al. "Extractive Summarization of Call Transcripts," arXiv Preprint arXiv:2103.10599, Mar. 19, 2021, (10 pages).
Brin, Sergey. "The PageRank Citation Ranking: Bringing Order To The Web," Proceedings of ASIS, vol. 98, Jan. 29, 1998, (17 pages).
Chandramouli, Aravind et al. "Unsupervised Paradigm For Information Extraction From Transcripts Using BERT," arXiv Preprint arXiv:2110.00949, Oct. 3, 2021, (11 pages).
Liang, Xinnian et al. "Unsupervised Keyphrase Extraction By Jointly Modeling Local and Global Context," arXiv Preprint arXiv:2109.07293v1 [cs.CL], Sep. 15, 2021, (10 pages).
Liu, Yang et al. "Text Summarization With Pretrained Encoders," arXiv Preprint arXiv:1908.08345v2 [cs.CL], Sep. 5, 2019, (11 pages).
Narayan, Shashi et al. "Stepwise Extractive Summarization and Planning With Structured Transformers," arXiv Preprint arXiv:2010.02744v1 [cs.CL], Oct. 6, 2020, (17 pages).
Padmakumar, Vishakh et al. "Unsupervised Extractive Summarization Using Pointwise Mutual Information," arXiv Preprint arXiv:2102.06272v2 [cs.CL], Mar. 22, 2021, (8 pages).
Sun, Xu et al. "Feature-Frequency-Adaptive On-Line Training For Fast and Accurate Natural Language Processing," Computational Linguistic, vol. 40, No. 3, Sep. 1, 2014, pp. 563-586.

(56) References Cited

OTHER PUBLICATIONS

Ushio, Asahi et al. "Back To The Basics: A Quantitative Analysis of Statistical and Graph-Based Term Weighting Schemes For Keyword Extraction," arXiv Preprint arXiv:210408028v2 [cs.LG], Sep. 13, 2021, (15 pages), United Kingdom.

Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

Banerjee, Siddhartha et al. "Multi-Document Abstractive Summarization Using ILP Based Multi-Sentence Compression," In Proceedings of the Twenty-Fourth International Joint Conference On Artificial Intelligence (IJCAI 2015), Jan. 2015, pp. 1208-1214.

Carbonell, Jaime et al. "The Use Of MMR, Diversity-Based Reranking For Reordering Documents and Producing Summaries," In Proceedings of the 21st Annual International ACM SIGIR Conference on Research and Development In Information Retrieval, Aug. 1998, pp. 335-336. DOI: 10.1145/290941.291025.

Chen, Yun-Nung et al. "Intra-Speaker Topic Modeling For Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.

Dang, Hoa Trang. "Overview of DUC 2005," In Proceedings of the Document Understanding Conference, Oct. 9, 2005, vol. 2005, (12 pages). [Available online: https://www-nlpir.nist.gov/projects/duc/pubs/2005papers/OVERVIEW05.pdf].

Filatova, Elena et al. "Event-Based Extractive Summarization," In Proceedings of ACL Workshop on Summarization, vol. 111, (2004), (8 pages).

Garg, Nikhil et al. "ClusterRank: A Graph Based Method For Meeting Summarization," IDIAP Research Institute, Jun. 2009, (5 pages), Martigny, Switzerland.

Gillick, Dan et al. "A Scalable Global Model For Summarization," In Proceedings of the NAACL HLT Workshop On Integer Linear Programming For Natural Language Processing, Jun. 2009, pp. 10-18.

Higashinaka, Ryuichiro et al. "Improving HMM-Based Extractive Summarization For Multi-Domain Contact Center Dialogues," In 2010 IEEE Spoken Language Technology Workshop, Dec. 12, 2010, pp. 61-66. DOI: 10.1109/SLT.2010.5700823.

Li, Chen et al. "Using Supervised Bigram-Based ILP for Extractive Summarization," In Proceedings of the 51st Annual Meeting of the Association For Computational Linguistics, Aug. 4, 2013, pp. 1004-1013, Sofia, Bulgaria.

McDonald, Ryan. "A Study Of Global Inference Algorithms In Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].

Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].

Mihalcea, Rada et al. "Textrank: Bringing Order Into Texts," In Proceedings of the 2004 Conference On Empirical Methods In Natural Language Processing, Jul. 2004, pp. 404-411. [Available online: https://www.aclweb.org/anthology/W04-3252.pdf].

Murray, Gabriel et al. "Generating and Validating Abstracts Of Meeting Conversations: A User Study," In Proceedings of the 6th International Natural Language Generation Conference (2010), (9 pages). [Available online: https://www.aclweb.org/anthology/W10-4211.pdf].

Nenkova, Ani et al. "The Impact Of Frequency On Summarization," Technical Report MSRTR-2005-101, Microsoft Research, Jan. 2005, (9 pages), Redmond, Washington. [Available online: http://citeseerx.ist.psu.edu/viewdoc/download?doi=10.1.1.529.6099&rep=rep1&type=pdf].

Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].

Rudra, Koustav et al. "Summarizing Situational Tweets in Crisis Scenarios: An Extractive-Abstractive Approach," IEEE Transactions On Computational Social Systems, Sep. 16, 2019, vol. 6, No. 5, pp. 981-993.

Rudra, Koustav. "Extracting and Summarizing Information From Microblogs During Disasters," Ph.D. Thesis, Apr. 2018, (199 pages).

Shang, Guokan et al. "Unsupervised Abstractive Meeting Summarization with Multi-Sentence Compression and Budgeted Submodular Maximization," In Proceedings of the 56th Annual Meeting Of The Association For Computational Linguistics (Long Papers), Jul. 15, 2018, pp. 664-674, Melbourne, Australia. [Available online: https://www.aclweb.org/anthology/P18-1062.pdf].

Steinberger, Josef et al. "Evaluation Measures for Text Summarization," Computing and Informatics, vol. 28, No. 2, (2009), pp. 1001-1026. [Available online: http://www.cai.sk/ojs/index.php/cai/article/viewFile/37/24].

Yih, Wen-tau et al. "Multi-Document Summarization By Maximizing Informative Content-Words," In IJCAI, Jan. 6, 2007, vol. 7, pp. 1776-1782. [Available online: https://www.aaai.org/Papers/IJCAI/2007/IJCAI07-287.pdf].

Non-Final Rejection Mailed on Oct. 17, 2024 for U.S. Appl. No. 17/937,606, 33 page(s).

Non-Final Rejection Mailed on Oct. 28, 2024 for U.S. Appl. No. 17/938,089, 6 page(s).

Notice of Allowance and Fees Due (PTOL-85) Mailed on Dec. 30, 2024 for U.S. Appl. No. 17/937,616, 2 page(s).

Notice of Allowance and Fees Due (PTOL-85) Mailed on Sep. 11, 2024 for U.S. Appl. No. 17/937,616, 14 page(s).

Final Rejection Mailed on Feb. 20, 2025 for U.S. Appl. No. 17/937,606, 38 page(s).

Notice of Allowance and Fees Due (PTOL-85) Mailed on Mar. 12, 2025 for U.S. Appl. No. 17/938,089, 10 page(s).

\* cited by examiner

| | | |
|---|---|---|
| 502A | hey matt, I'm calling to refill one of my prescriptions. | 0.477 — 1002A |
| 502B | Sure, I'd be very happy to help you with that. | 0.108 |
| 502C | Could I please have you verify your first and last name? | 0.187 |
| 502D | Sure my name is Mat Gordan | 0.179 |
| 502E | I should be in your system there. | 0.129 |
| ⋮ | Yeah, thank you. | 0.062 |
| | I see you verified your information with our automated system already | 0.048 |
| | So which medication are you calling about today? | 0.235 |
| ⋮ | I need to refill on my Lipitor | 0.562 |
| 502J | I see here that I can refill that for you for 30 days supply | 0.510 |
| 502K | Yeah, fantastic | 0.009 |

FIG. 10

QUERY-FOCUSED EXTRACTIVE TEXT SUMMARIZATION OF TEXTUAL DATA

BACKGROUND

Various embodiments of the present disclosure address technical challenges related to summarization of recorded interactions, conversations, encounters, and/or the like, such as in the form of a call transcript.

BRIEF SUMMARY

In general, embodiments of the present disclosure provide methods, apparatus, systems, computing devices, computing entities, and/or the like for providing a text-based summarization of a conversation in the form of a textual transcript. Various embodiments leverage the fact that certain conversations occur in a question-centric manner, such as a conversation between a caller and a help center agent. For example, a help center agent may initiate a conversation with a query to which the caller responds with answers and possibly additional queries. Throughout a conversation, various conversational subtopics may be discussed via different queries and answers.

Various embodiments of the present disclosure utilize systems, methods, and computer program products that generate and provide a summarization data object for a conversation. Generally, various embodiments provide a summarization centered around queries in the conversation and associated answers or statements (e.g., query-focused summarization). In various embodiments, an input data object with a plurality of sentence-level tokens is received. A subset of the plurality of sentence-level tokens are identified and classified as being queries, or interrogative sentence-level tokens. In various embodiments, the plurality of sentence-level tokens is divided and portioned into subtopic portions. Specific interrogative sentence-level tokens that are substantially similar to a set of target queries are then identified. The set of target queries may be queries that are deemed to be important and relevant to a summarization of the conversation and representative of the conversation as a whole. In various embodiments, a summarization data object is subsequently generated and provided, where the summarization data object includes selected sentence-level tokens deemed to be important and relevant to the interrogative sentence-level tokens that are substantially similar to target queries. As such, a summarization data object is provided that extracts queries and statements from a conversation that are important to, relevant to, and representative of the conversation as a whole.

In accordance with one aspect, a method is provided. In various embodiments, the method includes receiving an input data object including textual data of a conversation. The textual data includes a plurality of sentence-level tokens, and each sentence-level token includes one or more word-level tokens. In various embodiments, the method further includes generating and assigning an interrogative classification for one or more sentence-level tokens of the plurality of sentence-level tokens. The interrogative classification for a sentence-level token is determined based at least in part on evaluating the one or more word-level tokens of the sentence-level token. In various embodiments, the method further includes identifying one or more subtopic portions of the textual data. Each subtopic portion includes a portion of the plurality of sentence-level tokens and at least one interrogative sentence-level token. Each interrogative sentence-level token is located within one subtopic portion.

In various embodiments, the method further includes, for each interrogative sentence-level token, determining whether the interrogative sentence-level token is substantially similar to a target query of a plurality of target queries. In various embodiments, the method further includes, for each particular interrogative sentence-level token determined to be substantially similar to a target query, selecting one or more sentence-level tokens in a subtopic portion corresponding to the particular interrogative sentence-level token. In various embodiments, the method further includes generating a summarization data object including the selected one or more sentence-level tokens for each particular interrogative sentence-level token determined to be substantially similar to a target query. In various embodiments, the method further includes performing one or more summarization-based actions based at least in part on the summarization data object.

In accordance with another aspect, a computer program product is provided. The computer program product may include at least one computer-readable storage medium having computer-readable program code portions stored therein, the computer-readable program code portions including executable portions configured to cause at least one processor to at least to receive an input data object including textual data of a conversation. The textual data includes a plurality of sentence-level tokens, and each sentence-level token includes one or more word-level tokens. In various embodiments, the computer-readable program code portions further include executable portions configured to cause the apparatus to generate and assign an interrogative classification for one or more sentence-level tokens of the plurality of sentence-level tokens. The interrogative classification is determined based at least in part on evaluating the one or more word-level tokens of a sentence-level token. In various embodiments, the computer-readable program code portions further include executable portions configured to cause the apparatus to identify one or more subtopic portions of the textual data. Each subtopic portion includes a portion of the plurality of sentence-level tokens and at least one interrogative sentence-level token, and each interrogative sentence-level token is located within one subtopic portion.

In various embodiments, the computer-readable program code portions further include executable portions configured to cause the apparatus to, for each interrogative sentence-level token, determine whether the interrogative sentence-level token is substantially similar to a target query of a plurality of target queries. In various embodiments, the computer-readable program code portions further include executable portions configured to cause the apparatus to, for each particular interrogative sentence-level token determined to be substantially similar to a target query, select one or more sentence-level tokens in a subtopic portion corresponding to the particular interrogative sentence-level token. In various embodiments, the computer-readable program code portions further include executable portions configured to cause the apparatus to generate a summarization data object including the selected one or more sentence-level tokens for each particular interrogative sentence-level token determined to be substantially similar to a target query. In various embodiments, the computer-readable program code portions further include executable portions configured to cause the apparatus to perform one or more summarization-based actions based at least in part on the summarization data object.

In accordance with yet another aspect, an apparatus including a processor and at least one memory including computer program code is provided. In various embodiments, the at least one memory and the computer program code are configured to, with the processor, cause the apparatus to receive an input data object including textual data of a conversation. The textual data includes a plurality of sentence-level tokens, and each sentence-level token includes one or more word-level tokens. In various embodiments, the at least one memory and the computer program code are further configured to cause the apparatus to generate and assign an interrogative classification for one or more sentence-level tokens of the plurality of sentence-level tokens. The interrogative classification is determined based at least in part on evaluating the one or more word-level tokens of a sentence-level token. In various embodiments, the at least one memory and the computer program code are further configured to cause the apparatus to identify one or more subtopic portions of the textual data. Each subtopic portion includes a portion of the plurality of sentence-level tokens and at least one interrogative sentence-level token, and each interrogative sentence-level token is located within one subtopic portion.

In various embodiments, the at least one memory and the computer program code are configured to cause the apparatus to, for each interrogative sentence-level token, determine whether the interrogative sentence-level token is substantially similar to a target query of a plurality of target queries. In various embodiments, the at least one memory and the computer program code are configured to cause the apparatus to, for each particular interrogative sentence-level token determined to be substantially similar to a target query, select one or more sentence-level tokens in a subtopic portion corresponding to the particular interrogative sentence-level token. In various embodiments, the at least one memory and the computer program code are configured to cause the apparatus to generate a summarization data object including the selected one or more sentence-level tokens for each particular interrogative sentence-level token determined to be substantially similar to a target query. In various embodiments, the at least one memory and the computer program code are configured to cause the apparatus to perform one or more summarization-based actions based at least in part on the summarization data object.

BRIEF DESCRIPTION OF THE DRAWINGS

Having thus described the invention in general terms, reference will now be made to the accompanying drawings, which are not necessarily drawn to scale.

Figure 1:
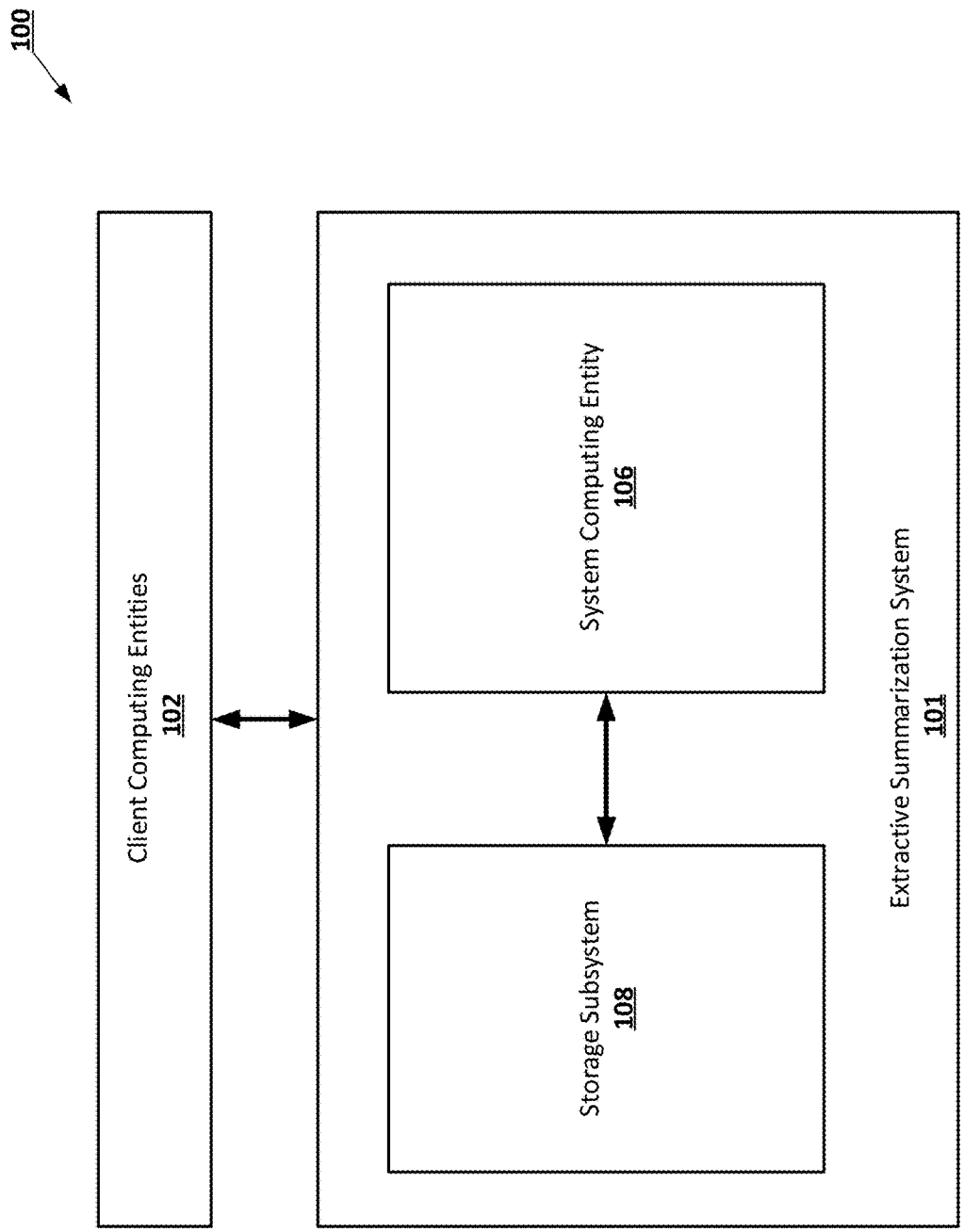

FIG. 1 provides an exemplary overview of a system that may be used to practice embodiments of the present disclosure.

Figure 2:
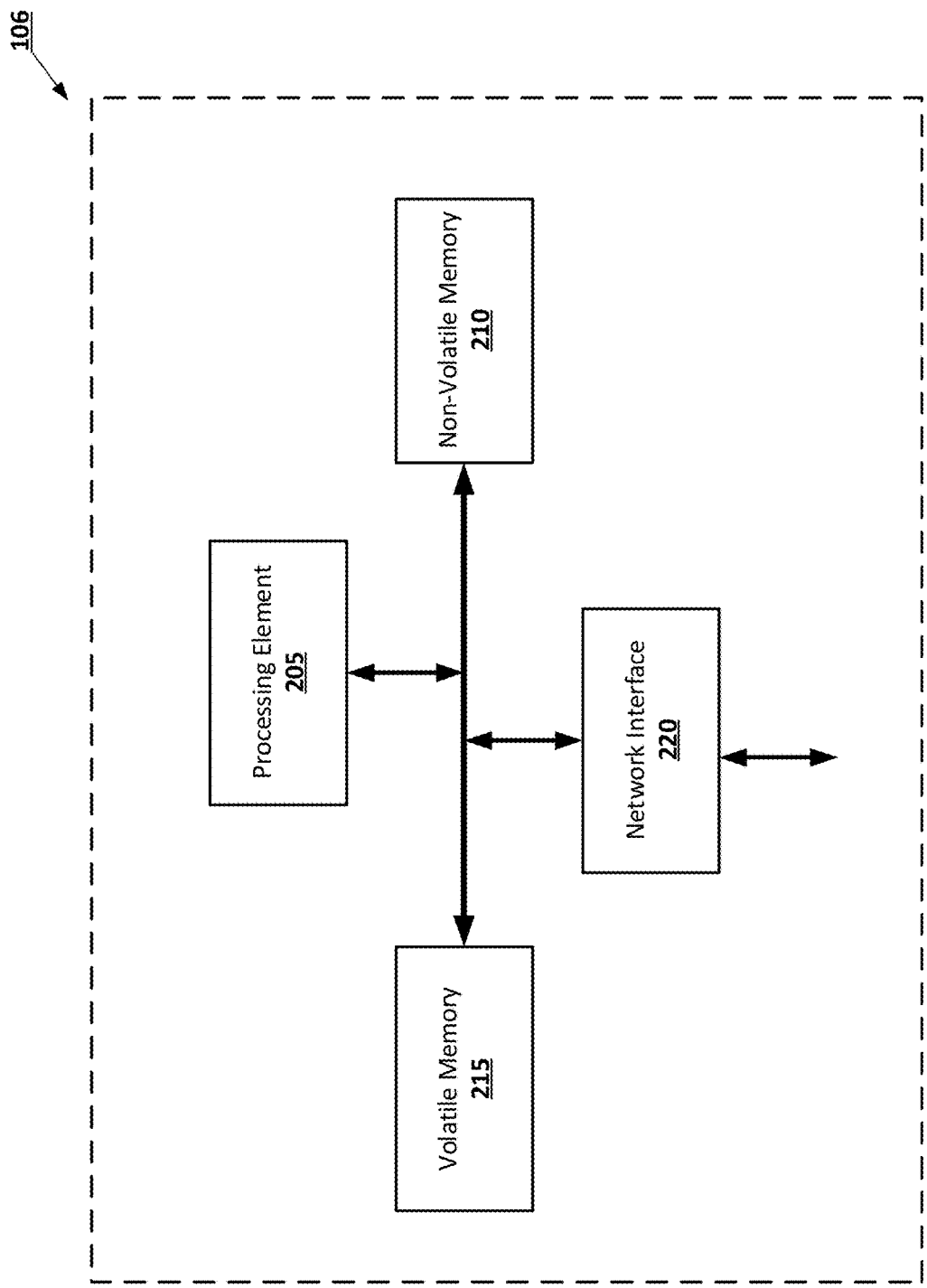

FIG. 2 provides a diagram of an example system computing entity, in accordance with some embodiments discussed herein.

Figure 3:
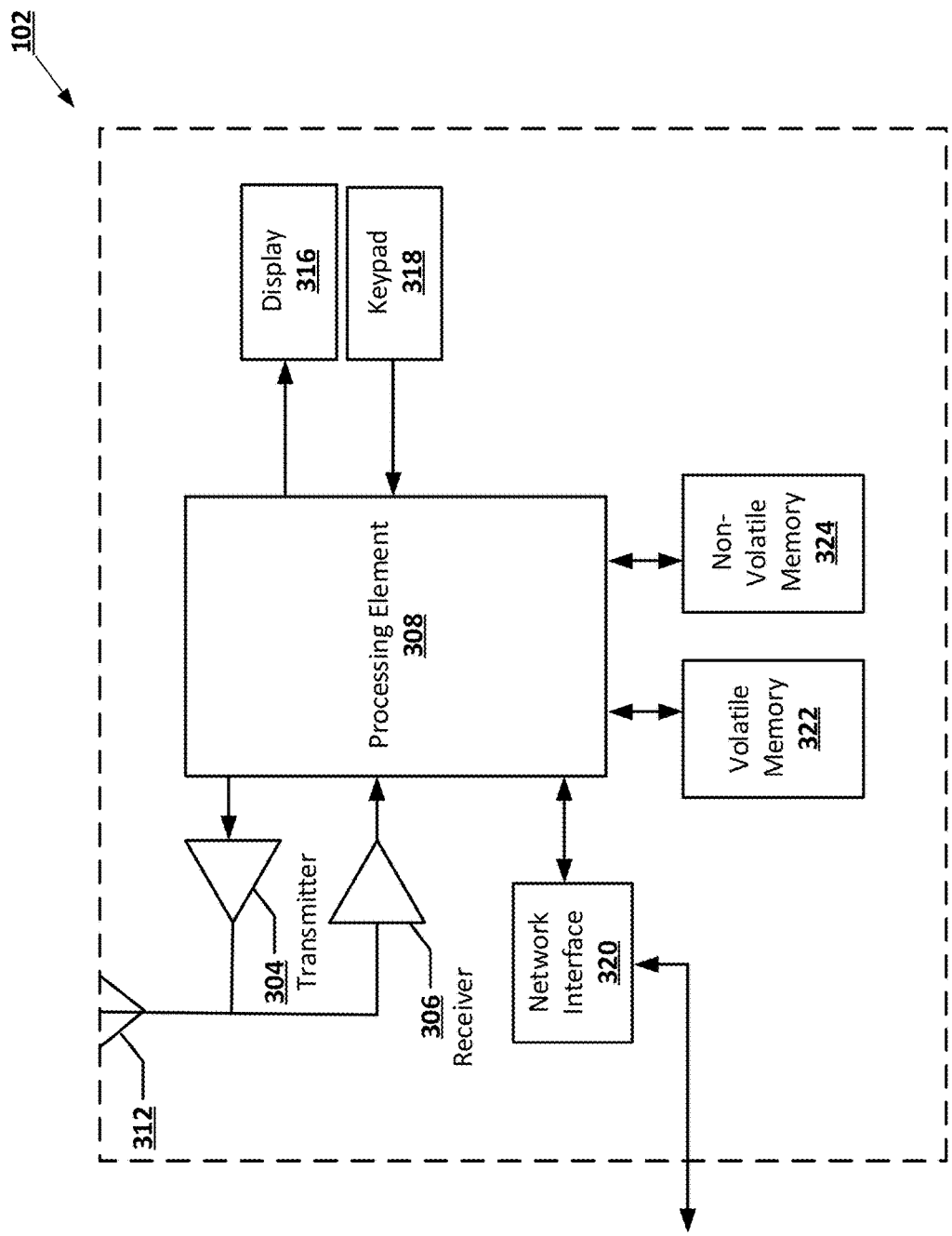

FIG. 3 provides a diagram of an example client computing entity, in accordance with some embodiments discussed herein.

Figure 4:
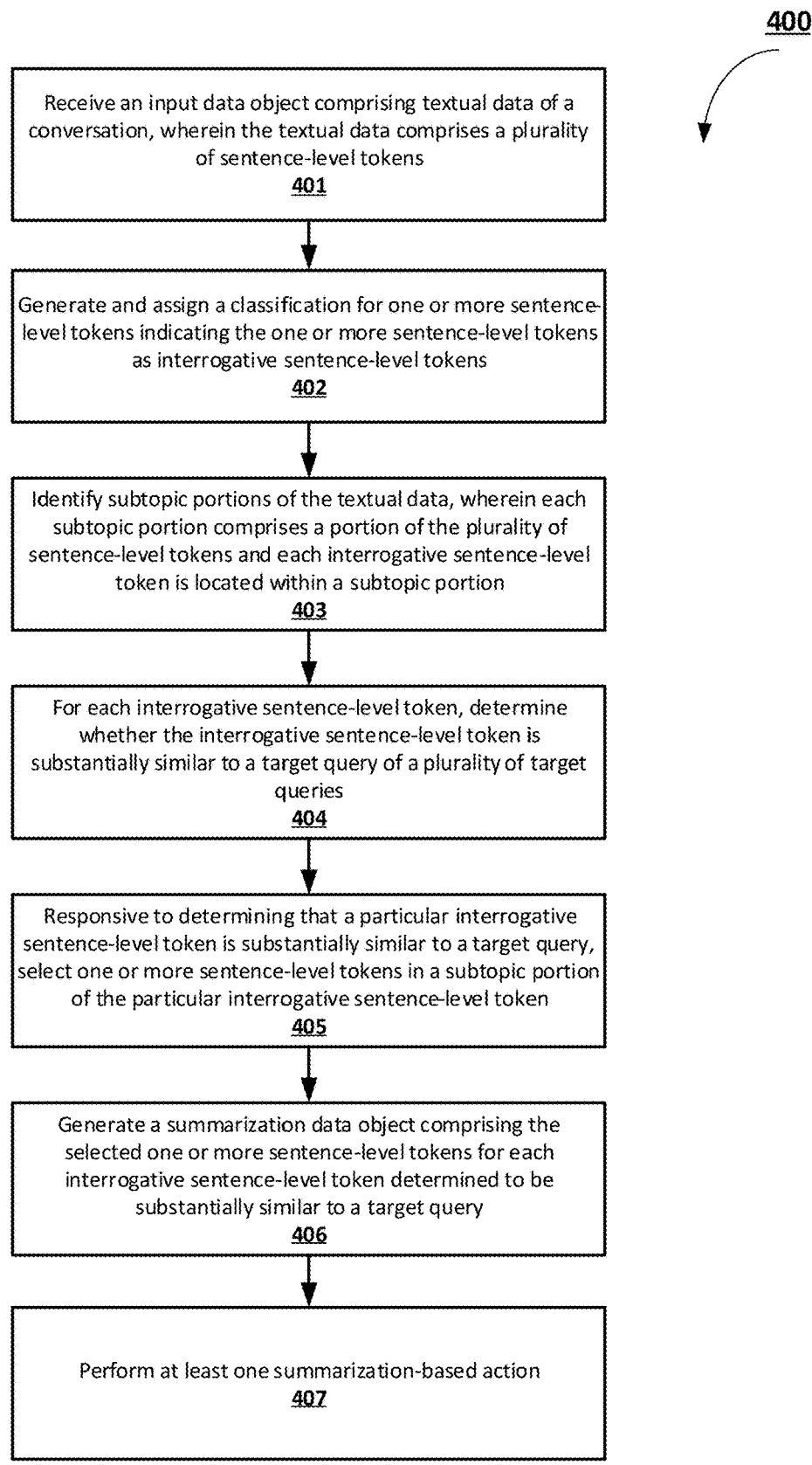

FIG. 4 provides a flowchart diagram of an example process for generating a summarization data object, in accordance with some embodiments discussed herein.

Figure 5:
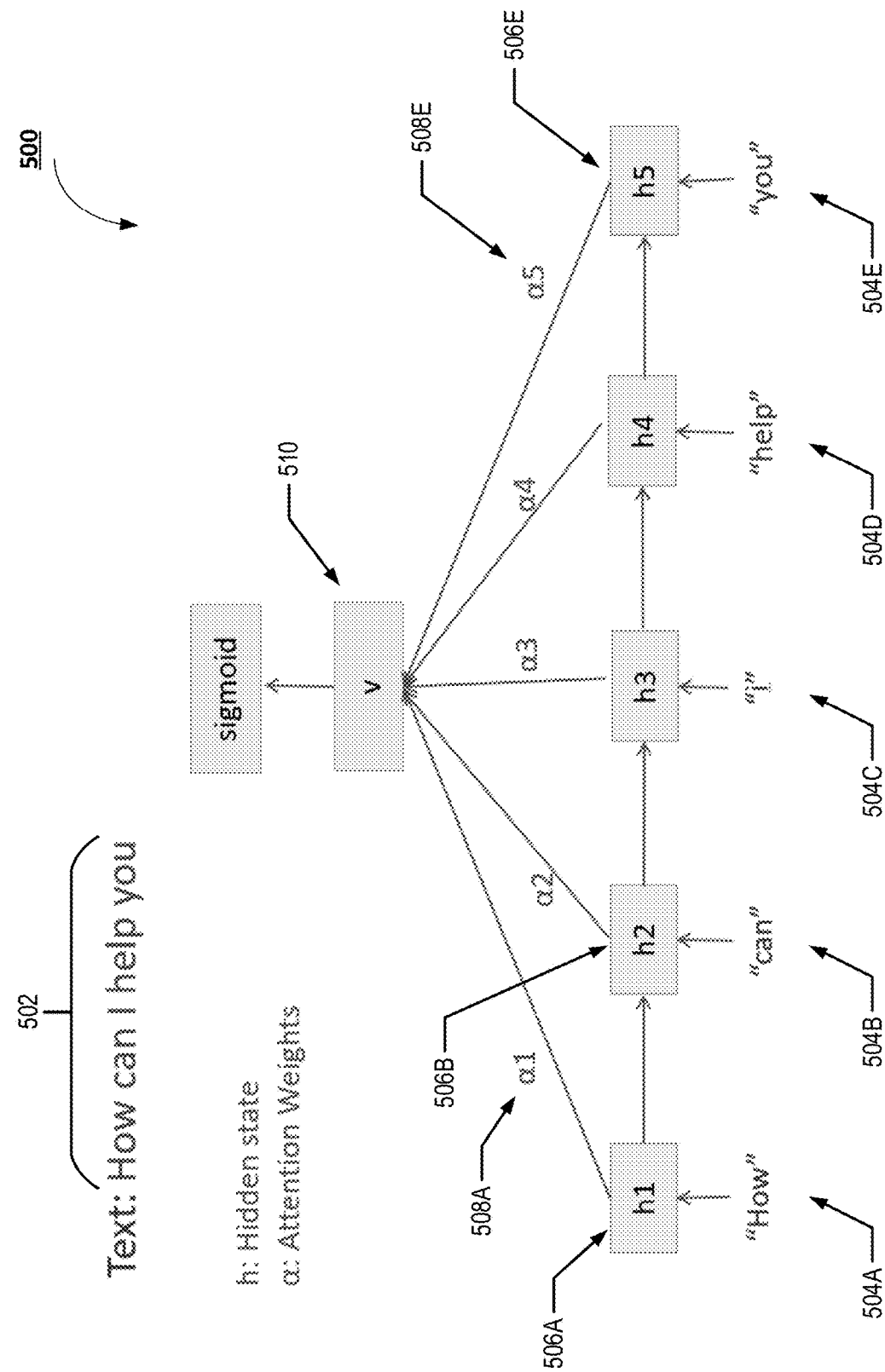

FIG. 5 provides an example model for classifying a sentence-level token as an interrogative sentence-level token, in accordance with some embodiments discussed herein.

Figure 6:
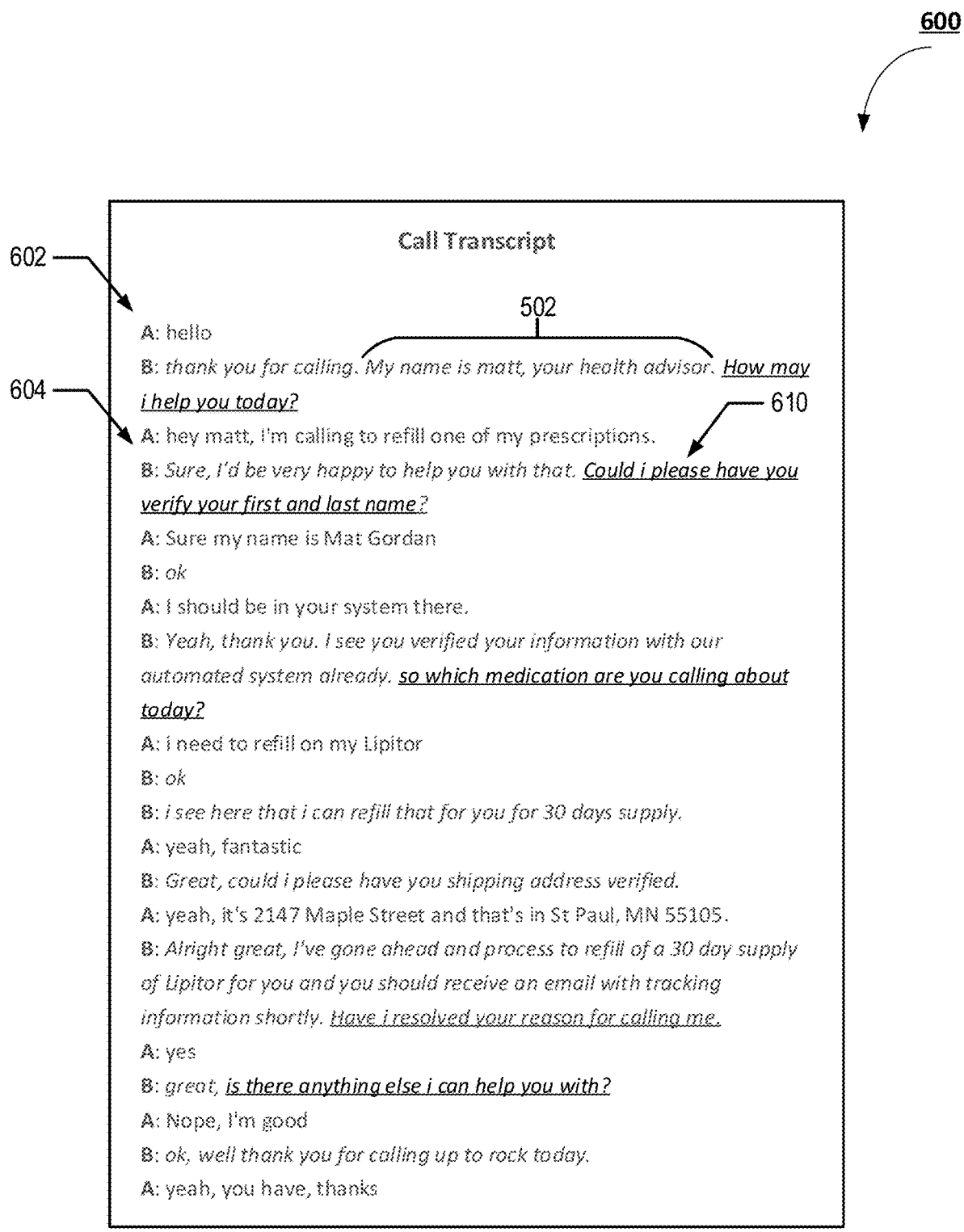

FIG. 6 provides example textual data comprising sentence-level tokens and interrogative sentence-level tokens, in accordance with some embodiments discussed herein.

Figure 7:
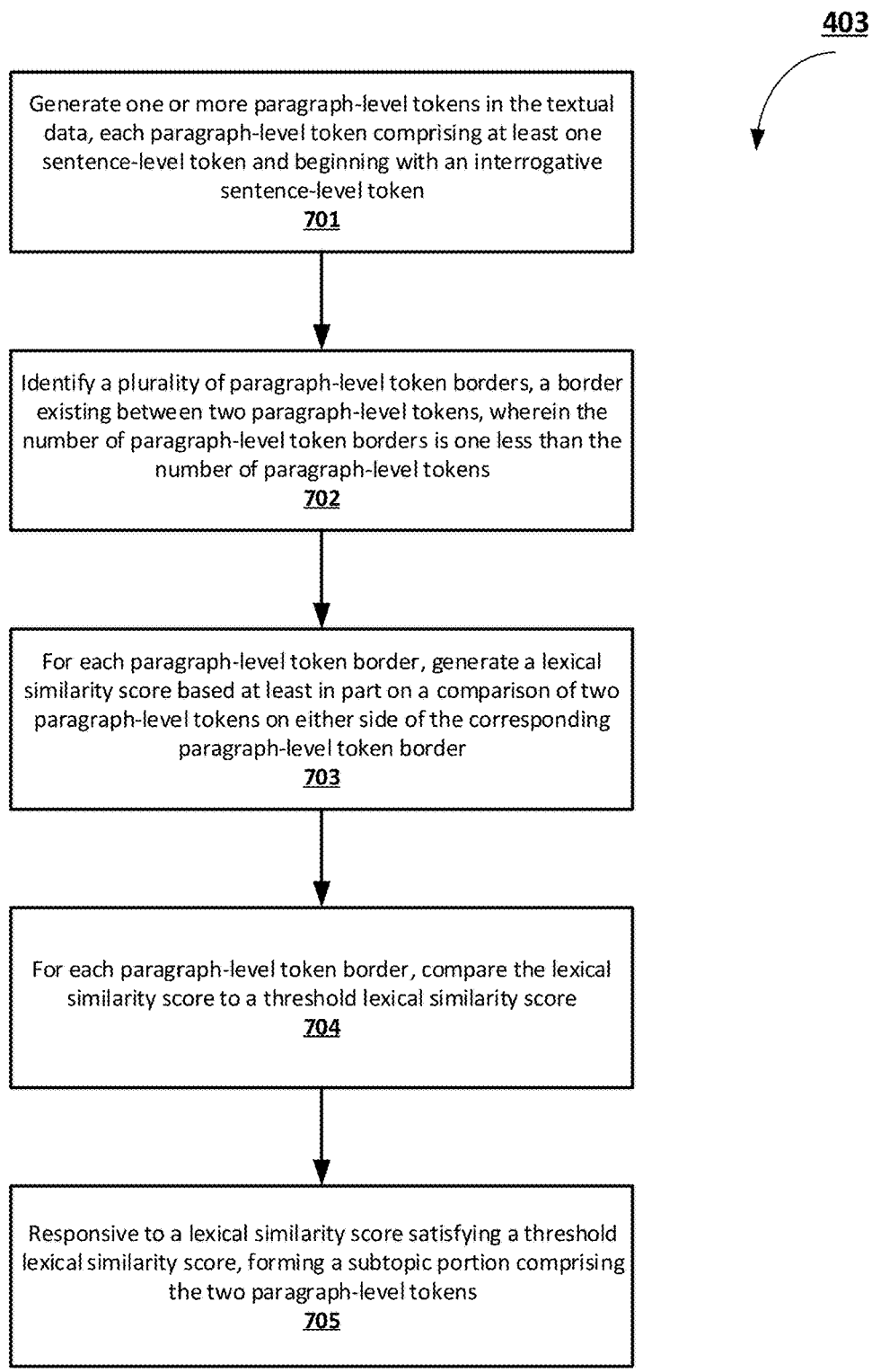

FIG. 7 provides a flowchart diagram of an example process for identifying subtopic portions of the textual data, in accordance with some embodiments discussed herein.

Figure 8:
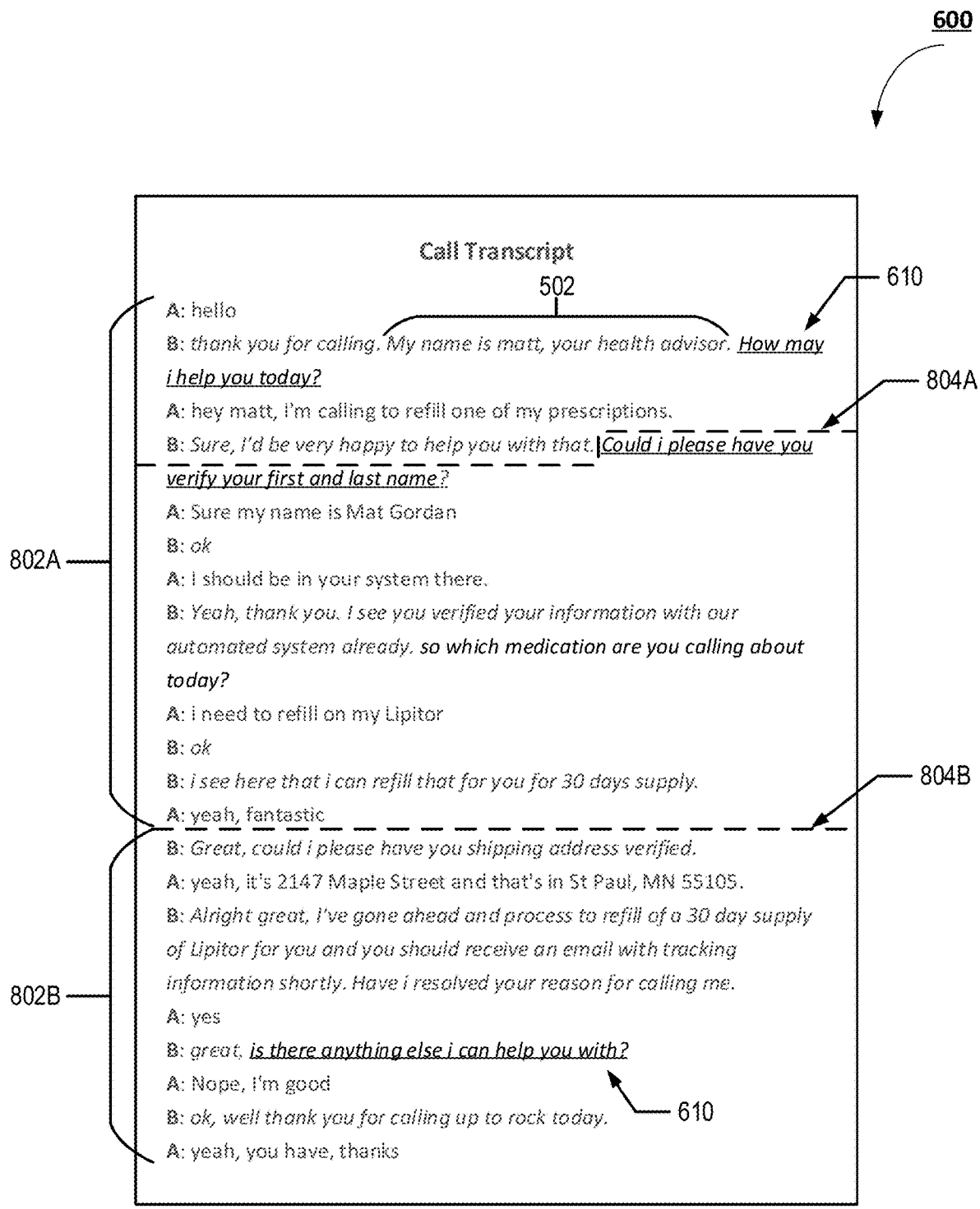

FIG. 8 provides example textual data in which subtopic portions are identified, in accordance with some embodiments discussed herein.

Figure 9:
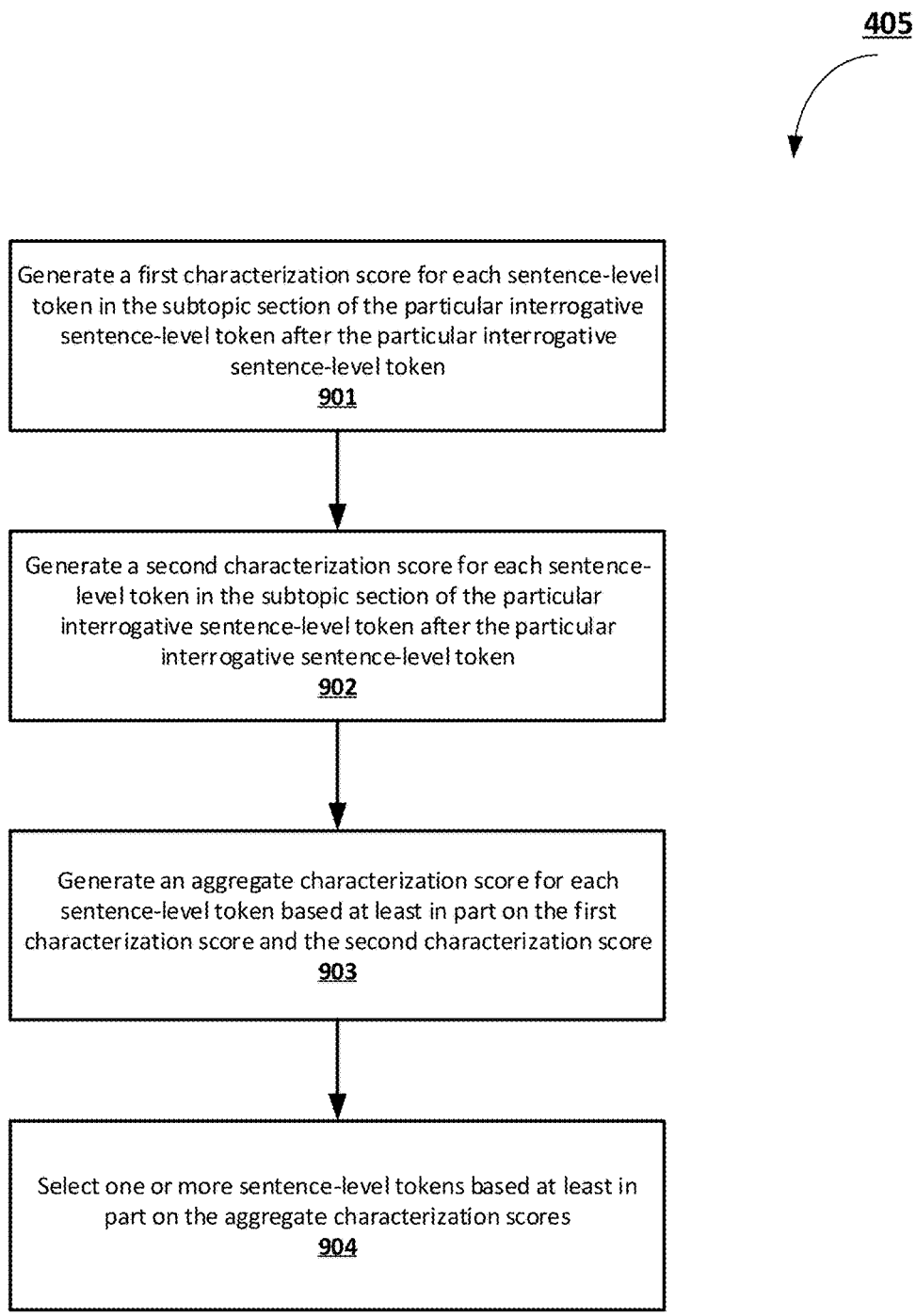

FIG. 9 provides a flowchart diagram of an example process for selecting sentence-level tokens in a subtopic portion, in accordance with some embodiments discussed herein.

FIG. 10 provides a diagram of selecting sentence-level tokens in a subtopic portion, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. OVERVIEW AND TECHNICAL
IMPROVEMENTS

Various embodiments of the present disclosure address technical challenges related to providing a text-based summarization of a conversation. For example, various embodiments may be applied towards providing text-based summarizations of help center telephonic conversations. In such examples, it is desirable to have summarizations or notes describing key aspects of the conversations. Such summarizations may be used as quick references to obtain information for repeated conversations, where information from past conversations may improve the experience of the conversation. Summarizations can also provide valuable information for conversation analytics and other applications.

However, referring to the help center example, an overwhelming number of telephonic conversations and transcribed textual data may need summarization, and exiting methods of manually analyzing conversations and transcribed textual data in their entirety to derive a summarization are inconsistent, unreliable, expensive, and time-consuming. Thus, various embodiments provide a technical solution in automated systems, methods, computer program products, and/or the like, for providing a summarization data object comprising textual data selectively extracted from an input data object describing a conversation.

Specifically, various embodiments may provide a summarization data object centered around pre-determined or learned target queries deemed to be important, relevant, or representative of a conversation. Returning to the help center example, target queries may be queries inquiring a customer's reason for calling, inquiring whether a help center agent has resolved a customer's issue, and inquiring whether the customer has other reasons for calling. Various embodiments advantageously use such target queries to generate a concise, accurate, and through summarization. In some embodiments, target queries for a conversation may be configured, thereby customizing a summarization data object for the conversation.

For example, various embodiments provide a summarization data object comprising textual data selectively extracted from an input data object. The extracted textual data is selected based at least in part on important and relevance to the conversation as a whole, thereby providing a summarization of the conversation and eliminating unneeded conversational utterances. As such, a provided summarization data object enables a quick and concise understanding of a conversation without needed to analyze the conversation in its entirety.

Various embodiments comprise an unsupervised method for generating and providing a text-based summarization (e.g., a summarization data object) of a conversation. Various embodiments advantageously ensure that a text-based summarization of a conversation is informationally complete by identifying queries or interrogative sentences that may be hidden throughout textual data by classifying each sentence as interrogative or non-interrogative. Meanwhile, various embodiments advantageously ensure that a text-based summarization of a conversation is concise by dividing the textual data into subtopic portions and extracting sentences from a subtopic portion of a specific interrogative sentence.

An exemplary application then of various embodiments of the present disclosure relates to receiving an input data object including textual data of a conversation, wherein the textual data includes a plurality of sentence-level tokens. Subsequently, a classification for one or more sentence-level tokens is generated and assigned, wherein the classification indicates that the one or more sentence-level tokens are interrogative sentence-level tokens. Subtopic portions of the textual data are then identified. Each subtopic portion includes a portion of the plurality of sentence-level tokens, some of which may be interrogative sentence-level tokens. It will also be appreciated that each interrogative sentence-level token corresponds to and/or is located within a subtopic portion. Then, it is determined whether each interrogative sentence-level token is substantially similar to a target query of a plurality of target queries. Responsive to determining that a particular interrogative sentence-level token is substantially similar to a target query, one or more sentence-level tokens in the subtopic portion of the particular interrogative sentence-level token are selected. A summarization data object may then be generated, wherein the summarization data object comprises the selected one or more sentence-level tokens for each interrogative sentence-level token determined to be substantially similar to a target query.

II. DEFINITIONS

The term "input data object" may refer to a data entity configured to describe a conversation between at least two parties, entities, individuals, persons, and/or the like. Specifically, the input data object may be and/or may comprise a textual representation or textual data of the conversation. For example, the conversation may be a telephonic interaction, and the input data object comprises textual data derived from the telephonic interaction. As another example, the conversation may be a text-based conversation (e.g., a live or real-time online chat, an e-mail conversation, and/or the like), and the input data object comprises textual data found in the text-based conversation. The input data object may comprise textual data in a structured format to at least an extent. For example, certain portions of textual data associated with one party (e.g., written by the one party, transcribed from words spoken by the one party) may be identified with an identifier for the one party, while other portions of textual data associated with another party may be likewise identified with an identifier for the other party. As such, the input data object comprises text in a format in which it may be determined to what party portions of the text pertain. In various embodiments, the input data object comprises textual data structured as a plurality of sentence-level tokens, each sentence-level token comprising one or more word-level tokens.

The term "word-level token" may refer to a data entity configured to describe an individual word, lexical unit, exclamation, syllable, and/or the like, of a conversation between at least two parties. As discussed, the input data object may comprise textual data structured as a plurality of sentence-level tokens, each sentence-level token comprising one or more word-level tokens. Stated otherwise, the input data object may comprise textual data structure as a plurality of word-level tokens. Word-level tokens may be generated by a variety of textual tokenization methods, operations, functions, and/or techniques that may separate individual words in textual data. In various embodiments, different textual tokenization methods may be used based at least in part on delimiters (e.g., spaces, tabs, periods, commas, line breaks). A word-level token may specifically be a string, array, data structure, embeddings, and/or the like, of one or more characters or character representations that compose a described word.

The term "sentence-level token" may refer to a data entity configured to describe a sentence (e.g., one or more words), lexical unit, utterance, statement, and/or the like, of a conversation between at least two parties. A sentence-level token is composed and/or comprises one or more word-level tokens. A sentence-level token may be a string, array, data structure, embeddings, and/or the like, of one or more word-level tokens or word representations. As mentioned, the input data object may comprise textual data structured as a plurality of sentence-level token, and each sentence-level token may then represent and describe a sentence of the conversation. Sentence-level tokens may be generated by a variety of sentence tokenization methods, operations, functions, and/or techniques that may separate sentences in textual data. For example, sentence-level tokens may be generated by separating text by a sentence delimiter (e.g., a period, a line break). In some embodiments, sentence-level tokenization may be performed before word-level tokenization. For example, a sentence-level token may be a string, array, data structure, embeddings, and/or the like, of one or more characters or character representations that compose a sentence as a whole, or a sentence-level token may additionally or alternatively be composed of word-level tokens.

The term "interrogative sentence-level token" may refer to a data entity configured to describe a sentence of a conversation conveyed in an interrogative manner (e.g., to elicit information). In other words, an interrogative sentence-level token may be a sentence-level token that specifically describes an interrogative sentence, a question, a query, and/or similar terms used interchangeably herein. An interrogative sentence-level token may be a sentence-level token assigned or associated with an interrogative classification or indicator. As such, an interrogative sentence-level token may have similar characteristics and structure to a non-interrogative sentence-level token, and may be composed of one or more characters or word-level tokens.

The term "target query" may refer to a data entity configured to describe an interrogative sentence, a question, a query, and/or the like, deemed to be of interest, importance to a conversation, relevance to a conversation, and/or representative of a conversation. A target query may be distinct from an interrogative sentence-level token, which may specifically be a tokenized data entity from a larger corpus of textual data. That is, a target query may be independently generated or provided. In an example concerning a help center telephonic conversation, a target query important to the conversation may be How can I help you today? or Have I resolved your issues? A target query may be a text object.

The term "summarization data object" may refer to a data entity configured to describe a summarization of a conversation. It may be appreciated that a summarization of a conversation is necessarily shorter, leaner, or more concise than the original conversation, and therefore, a summarization data object may comprise a subset of the textual data of the input data object, or textual data extracted from the input data object. For example, a summarization data object comprises extracted textual data of deemed importance, and may not include textual data describing utterances that may not be as important or relevant to the conversation as a whole. In various embodiments, a summarization data object comprises textual data structured as a plurality of sentence-level tokens, some of which may be interrogative sentence-level tokens. A summarization data object may be a data structure, an n-order tensor, embeddings, and/or the like, configured to describe a summarization of a conversation by comprising extracted or selected textual data.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example system architecture 100 for providing a summarization of a conversation. The system architecture 100 includes an extractive summarization system 101 configured to receive input data objects comprising textual data from client computing entities 102, process the textual data, and provide summarization data objects comprising textual data extracted from the input data objects to the client computing entities 102. In various embodiments, the extractive summarization system 101 may be configured to process the textual data to identify interrogative sentence-level tokens and extract specific sentence-level tokens from textual data based on informational content and linguistic quality.

In some embodiments, the extractive summarization system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). In various embodiments, the extractive summarization system 101 comprises an application programming interface (API), receives an input data object from a client computing entity 102 as an API call, and provides a summarization data object as an API response.

The extractive summarization system 101 may include a system computing entity 106 and a storage subsystem 108. The system computing entity 106 may be configured to receive input data objects from one or more client computing entities 102, process the textual data, and provide summarization data objects comprising textual data extracted from the input data objects to the client computing entities 102. In various embodiments, the system computing entity 106 is a cloud-based computing system and comprises one or more computing devices each configured to share and allocate computer processing resources and data The storage subsystem 108 may be configured to store input data objects received by the system computing entity 106. In various embodiments, the storage subsystem 108 may be configured to also store target queries to be used when processing textual data of input data objects. The storage subsystem 108 may be configured to store other data or information used by the system computing entity 106 to perform various extractive summarization and textual data processing tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 106, according to one embodiment of the present disclosure. As shown in FIG. 2, in one embodiment, the system computing entity 106 may include, or be in communication with, one or more processing elements 205 (also referred to as processors, processing circuitry, and/or similar terms used herein interchangeably) that communicate with other elements within the system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 106 with the assistance of the processing element 205 and operating system.

As indicated, in one embodiment, the system computing entity 106 may also include one or more network interfaces 220 for communicating with various computing entities (e.g., one or more other system computing entities 106, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 106 may include, or be in communication with, one or more input elements, such as a keyboard input, a mouse input, a touch screen/display input, motion input, movement input, audio input, pointing device input, joystick input, keypad input, and/or the like. The system computing entity 106 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by various parties, and the system architecture 100 may include one or more client computing entities 102. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 106 via a network interface 320.

Via these communication standards and protocols, the client computing entity 102 can communicate with various other entities (e.g., system computing entities 106, storage subsystem 108) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 108 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 208). For example, the user interface may be a user application, browser, user interface, and/or similar words used herein interchangeably executing on and/or accessible via the client computing entity 102 to interact with and/or cause display of information/data from the system computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 106, various other computing entities, and/or a storage subsystem 108.

In another embodiment, the client computing entity 102 may include one or more components or functionality that are the same or similar to those of the system computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present disclosure address technical challenges related to providing a text-based summarization of a conversation. For example, various embodiments provide a summarization data object comprising textual data selectively extracted from an input data object. The extracted textual data is selected based at least in part on important and relevance to the conversation as a whole, thereby providing a summarization of the conversation and eliminating unneeded conversational utterances. As such, a provided summarization data object enables a quick and concise understanding of a conversation without needed to analyze the conversation in its entirety.

FIG. 4 provides a flowchart diagram of an example process 400 for providing a text-based summarization of a conversation, according to an embodiment of the present disclosure. In various embodiments, system computing entity 106 comprises means, such as processing element 205, memories 210, 215, network interface 220, and/or the like, for performing various operations for providing a text-based summarization of a conversation, such as the operations of process 400. In some embodiments, a client computing entity 102 is also configured to provide a text-based summarization of a conversation. For example, a client computing entity 102 comprises means, such as processing element 308, memories 322, 324, network interface 320, user interface, and/or the like, for performing various operations for providing a text-based summarization of a conversation, such as the operations of process 400.

Process 400 comprises operation 401, and in one embodiment, process 400 begins with operation 401. Operation 401 comprises receiving an input data object. The data object comprises textual data of a conversation, and the textual data comprises a plurality of sentences. In an example embodiment, the process 400 is triggered by receiving an input data object, such as via an API call. That is to say, an API call comprising the input data object may be received, at operation 401. In various embodiments, the input data object is received by the system computing entity 106, such as over a network via a network interface 220 and/or through a user interface.

In various embodiments, the textual data of an input data object is a telephonic conversation transcript, or transcribed text from a telephonic conversation. For example, the textual data is generated using an automatic speech recognition (ASR) system configured to generate textual data from audio data. In various embodiments, the input data object comprises audio data, and receiving the input data object comprises generating textual data using an ASR system. In some embodiments, the input data object may be an image of textual data, and pre-processing may comprise performing image text recognition to generate and extract textual data from the image that may be further processed and parsed. In other embodiments, the conversation may be a textual conversation, such as a conversation over email, an instant messaging (IM) service, short message service (SMS), and/ or the like. In such embodiments, the input data object comprises textual data extracted and derived from the textual conversation. In some embodiments, the input data object may further comprise metadata for textual data, such as identifiers for which conversation party uttered (e.g., spoke, typed) certain portions of the textual data, timestamps for certain portions of the textual data, and/or the like.

In various embodiments, receiving an input data object comprises pre-processing the input data object, or the textual data of the input data object. For instance, the input data object may simply comprise textual data, and pre-processing may be performed to generate a plurality of sentence-level tokens, such as by performing sentence-level tokenization operations on the textual data. A sentence-level token may be associated, identified, labelled, and/or the like, with a specific conversation party that uttered the sentence described by the sentence-level token. Pre-processing may then further comprise performing word-level tokenization operations to generate one or more word-level tokens for and/or within each sentence-level token. Thus, it may be understood that a sentence-level token may be composed of and/or may comprise one or more word-level tokens.

In various embodiments, pre-processing may comprise stemming. Specifically, individual word-level tokens may be reduced to a linguistic base or "stem" form to aid and enable future processing. For instance, a word-level token reciting cats may be reduced and modified to instead recite cat. As another example, word-level tokens respectively reciting democracy, democratic, and democratization may all be reduced and modified to each recite democra-. In various embodiments, lemmatization may be performed in addition to or instead of stemming. Lemmatization may comprise a vocabulary-focused, morphological analysis of each word-level token to achieve the same objective of reducing and modifying word-level tokens to base forms.

Pre-processing may also comprise removing repeated words or utterances from the textual data. In the natural flow of a spoken conversation, words or utterances may be repeated or stuttered, due to a linguistic tick, stutter, or behavior for example. For example, one might say okay okay, I just I just don't know as a response to a query, such a response containing repeated words as a subconscious and/or conscious indication of uncertainty. Repeated words or utterances may arise in other scenarios and examples. As such, textual data for a spoken conversation may comprise repeated words or utterances, which may be removed during pre-processing in some embodiments. In various embodiments, the system computing entity 106 may be configured to determine the presence of repeated words in the textual data of the input data object. For example, the system computing entity 106 may be configured to at least parse the textual data, tokenize the textual data on a word-level, and/or detect sequentially consecutive word-level tokens that are identical.

In various embodiments, pre-processing comprises removing automatic speech recognition (ASR) identifiers. For instance, the textual data may be transcribed textual data generated by an ASR system, and such an ASR system may generate various ASR identifiers within the transcribed textual data. For example, the textual data may comprise an ASR identifier such as \UNK in place of a word that the ASR system did not recognize, or a word that is unknown. As another example, the textual may comprise an ASR identifier for sounds that are not linguistic in nature, such as \dial indicating a dialing sound or \laughter indicating a laughter sound. In any regard, such ASR identifiers may be deemed to be irrelevant to the informational content of the textual data and may be removed in pre-processing.

In various embodiments, pre-processing comprises removing filler words, or words deemed to have no informational relevant or meaning. For example, words such as okay, umm, hmmm, and/or the like, may be deemed to be filler words and removed from the textual data of the input data object. In various embodiments, filler words may be defined, such as by client computing entities 102. For example, a client computing entity 102 may define or configure a specific word as a filler word, thereby causing a system computing entity 106 to remove the specific word from textual data during pre-processing. For example, the storage subsystem 108 may store a configurable list of filler words, and the system computing entity 106 may reference the configurable list of filler words while parsing the textual data of the input data object to remove filler words on the configurable list from the textual data during pre-processing.

In various embodiments, pre-processing may comprise removing certain textual data. For example, common language processing stop words, such as a, any, the, is, at, which, and/or on, are identified and removed from the textual data. Various stop words may be configured and customized. For example, the storage subsystem 108 comprises a set of stop words that may be modified. Such stop words may be identified, located, and removed by parsing the textual data, in various embodiments, and detecting that a string of characters is substantially similar to the characters of a particular stop word. In some embodiments, removing stop-words is performed after various other pre-processing operations, and may be the final pre-processing operation (however, removing stop-words can be done at any step).

Process 400 may further comprise operation 402. In one embodiment, operation 402 may follow operation 401, after an input data object comprising textual data is received and the textual data is pre-processed. Operation 402 comprises generating and assigning a classification for one or more sentence-level tokens of the plurality of sentence-level tokens indicating each sentence-level token as an interrogative sentence-level token. In some embodiments, each sentence-level token of the plurality of sentence-level tokens is classified as either an interrogative sentence-level token or simply a normal sentence-level token (e.g., a non-interrogative sentence-level token).

In various embodiments, an interrogative classification or a non-interrogative classification for a given sentence-level token is generated based at least in part on the one or more word-level tokens of the given sentence-level token. That is, each word-level token of the given sentence-level token is evaluated to determine a classification for the given sentence-level token. Furthermore, each word-level token may be evaluated in a contextual manner with respect to other word-level tokens of the given sentence-level token. For example, the word-level tokens may be evaluated, and a classification may be generated, based at least in part on a self-attention based bidirectional long short-term memory (LSTM) model.

Referring now to FIG. 5, a self-attention based bidirectional LSTM model 500 is provided. In various embodiments, the self-attention based bidirectional LSTM model 500 is used to determine and generate an interrogative classification or a non-interrogative classification for a sentence-level token 502. However, it will be understood that other various models that may be configured to determine the interrogative nature of a sentence-level token 502 and generate an interrogative classification or a non-interrogative classification for a sentence-level token 502 may be implemented in some embodiments. For example, some embodiments may employ a plain LSTM model, transformers, a fine-tuned bidirectional encoder representations from transformers (BERT) model, and/or the like.

As shown in FIG. 5, a sentence-level token 502 comprises one or more word-level tokens 504 which are evaluated contextually in the self-attention based bidirectional LSTM model 500 to determine, generate, and assign a classification for the sentence-level token 502. The self-attention based bidirectional LSTM model 500 may first generate and assign embeddings 506 for the word-level tokens 504 using an embedding matrix. For example, each word-level token 504A-E is assigned with an embedding 506A-E. Each embedding 506A-E may summarize information occurring both before and after (e.g., in a bidirectional manner) each corresponding word-level token 504A-E, and thereby incorporate contextual information. These embeddings 506A-E are further modified by a self-attention mechanism configured to generate attention weights 508A-E for each embeddings 506A-E or word-level token 504A-E. These attention weights 508A-E are configured to be biased towards words that may be important in generating an interrogative or non-interrogative classification.

The embeddings 506A-E with the attention weights 508A-E may form at least in part a sentence representation 510. The sentence representation 510 may be further processed through various layers of the self-attention based bidirectional LSTM model 500, in various embodiments. For example, the sentence representation 510 may be processed using a logistic regression layer and/or a support vector machine layer to generate the binary classification of interrogative or non-interrogative. In various embodiments, transformers may be used to generate the binary classification. In various embodiments, the self-attention based bidirectional LSTM model 500 is pre-trained in a supervised manner with a training dataset including sentence-level tokens labelled as interrogative and other sentence-level tokens labelled as non-interrogative. In some embodiments, the training dataset comprises textual data describing conversations of a similar nature (e.g., help center telephonic conversations) to the textual data of the input data object. Thus, the self-attention based bidirectional LSTM model 500 is configured to generate an interrogative classification or a non-interrogative classification for a sentence-level token 502 based at least in part on the word-level tokens 504 composing the sentence-level token 502.

Thus, using the self-attention based bidirectional LSTM model 500, one or more sentence-level tokens 502 of the textual data may be classified as interrogative sentence-level tokens. FIG. 6 illustrates example textual data 600 comprising a plurality of sentence-level tokens 502 uttered by two parties 602, 604 in a conversation. As will be appreciated, the textual data 600 illustrated in FIG. 6 has been pre-processed and tokenized such that individual sentence-level tokens 502 may be identified. FIG. 6 further illustrates one or more sentence-level tokens 502 being classified as interrogative sentence-level tokens 610 (shown in underline). For example, a sentence-level token 502 uttered by a second party 604 labelled as "B" reciting Could I please have you verify your first and last name? is classified as an interrogative sentence-level token 610. FIG. 6 further illustrates sentence-level tokens 502 being associated with a conversation party (e.g., a first party 602, a second party 604). For instance, a sentence-level token 502 may comprise an identifier indicating which conversation party uttered the sentence described by the sentence-level token 502.

Returning to FIG. 4, process 400 may further comprise operation 403. In one embodiment, operation 403 may follow operation 402. Operation 403 comprises identifying subtopic portions of the textual data, each subtopic portion comprising a portion of the plurality of sentence-level tokens 502 and one or more interrogative sentence-level tokens 610. For example, subtopic portions of the textual data may be identified subsequent to classifying one or more sentence-level tokens 502 of the textual data as interrogative sentence-level tokens 610. As a result of operation 403 then, the textual data may be composed of one or more subtopic portions which may not overlap; that is, each sentence-level token 502 is located within and corresponds to only one subtopic portion, and likewise, each interrogative sentence-level token 610 is located within and corresponds to only one subtopic portion.

In various embodiments, operation 403 may be embodied by the operations provided in FIG. 7. For instance, the operations illustrated in FIG. 7 are directed to identifying subtopic portions in the textual data. In various embodiments, identifying subtopic portions in the textual data comprises operation 701. In one embodiment, identifying subtopic portions in the textual data begins at operation 701.

Operation 701 comprises generating one or more paragraph-level tokens in the textual data, each paragraph-level token comprising at least one sentence-level token 502 and beginning with an interrogative sentence-level token 610. In various embodiments, each paragraph-level token may comprise sentence-level tokens 502 uttered by both a first party 602 and a second party 604 of the conversation. Each paragraph-level token may be generated specifically to begin with an interrogative sentence-level token 610 and end with a sentence-level token 502 occurring in the textual data just before an interrogative sentence-level token 610. It may be appreciated then that operation 701 may be understood as paragraph-level tokenization of the textual data using interrogative sentence-level tokens 610 as a delimiter.

The embodiment of operation 404 comprises operation 702. In one embodiment, operation 702 may follow operation 701. Operation 702 comprises identifying a plurality of paragraph-level token borders, a paragraph-level token border existing and/or being positioned between two paragraph-level tokens. The number of paragraph-level token borders is then one less than the number of paragraph-level tokens. For example, textual data comprising two paragraph-level tokens may comprise one paragraph-level token border between the two paragraph-level tokens. In various embodiments, each paragraph-level token border is associated with and/or corresponds to two paragraph-level tokens.

The embodiment of operation 404 comprises operation 703. In one embodiment, operation 703 may follow operation 702. Operation 703 comprises generating a lexical similarity score for each paragraph-level token border. In various embodiments, the lexical similarity score for a paragraph-level token border is generated based at least in part on a comparison of the two corresponding paragraph-level tokens (e.g., two paragraph-level tokens positioned on either side of the paragraph-level token border). The lexical similarity score may indicate then a vocabulary or linguistic shift between the two corresponding paragraph-level tokens.

For example, a lexical similarity score for a paragraph-level token border may be determined based at least in part on counting the occurrences of different word-level tokens 504 in each of the corresponding paragraph-level tokens and generating a lexical similarity score based at least in part on a dot product of two vectors representing the number of occurrences of each of the different word-level tokens 504 in the two corresponding paragraph-level tokens. As another example, a lexical similarity score may be determined based at least in part on the number of new word-level tokens 504 introduced in the sequentially second paragraph-level token of the two corresponding paragraph-level tokens (e.g., the number of word-level tokens 504 present in the second paragraph-level token that are not present in the first paragraph-level token). As yet another example, a lexical similarity score may be determined based at least in part on the number of word-level tokens 504 that are present in both of the two corresponding paragraph-level tokens. In various embodiments, the lexical similarity score may be determined using any combination of the aforementioned techniques.

FIG. 7 further illustrates operation 704. In one embodiment, operation 704 may follow operation 703. Operation 704 comprises comparing the lexical similarity score for each paragraph-level token border to a threshold lexical similarity score. The threshold lexical similarity score may be determined to be indicative of a major or significant vocabulary/linguistic shift. For example, a lexical similarity score satisfying the threshold lexical similarity score may indicate that the two corresponding paragraph-level tokens are significantly different with respect to their vocabulary and/or their linguistic content.

In one embodiment, operation 705 may then follow operation 704. Operation 705 comprises, responsive to a lexical similarity score satisfying a threshold lexical similarity score, forming a subtopic portion comprising the two corresponding paragraph-level tokens. For example, the lexical similarity score satisfying the threshold lexical similarity score (e.g., being less than the threshold lexical similarity score) may indicate that the two corresponding paragraph-level tokens are substantially similarly and therefore may include content discussing the same subtopic of the conversation. As such, the two corresponding paragraph-level tokens are combined into one subtopic portion. Alternatively, the two corresponding paragraph-level tokens may not be combined into one subtopic portion if the lexical similarity score does not satisfy a threshold lexical similarity score. In such instances, the two corresponding paragraph-level tokens each may be located within a different subtopic portion.

It will be understood then that by performing the above described operations (e.g., operations 703, 704, 705) for each paragraph-level token border, subtopic portions are formed potentially with more than two paragraph-level tokens, and subtopic portions are separated by paragraph-level token borders with lexical similarity scores that do not satisfy the threshold lexical similarity score. In various embodiments, the above described operations may be performed in parallel for each paragraph-level token border. In other embodiments, the above described operations may be performed individually for each paragraph-level token border, such that paragraph-level token borders are sequentially added to a subtopic portion. In various embodiments, subtopic portions are identified using TextTiling techniques and/or the like.

FIG. 8 provides example textual data comprising one or more identified subtopic portions 802 (e.g., subtopic portions 802A, 802B), each subtopic portion comprising a portion of the plurality of sentence-level tokens 502 and at least one interrogative sentence-level token 610. FIG. 8 further illustrates paragraph-level token borders 804 (e.g., borders 804A, 804B).

For example, paragraph-level token border 804A may be positioned between and correspond to two paragraph-level tokens (not explicitly illustrated). However, a lexical similarity score generated for paragraph-level token border 804A may satisfy a threshold lexical similarity score, and as such, the two corresponding paragraph-level tokens on either side of paragraph-level token border 804A are located within one subtopic portion 802A. Meanwhile, for example, paragraph-level token border 804B may also be positioned between and correspond to two paragraph-level tokens (also not explicitly illustrated). In the illustrated embodiment, the lexical similarity score generated for paragraph-level token border 804B does not satisfy a threshold lexical similarity score. Accordingly, the two corresponding paragraph-level tokens for paragraph-level token border 804B do not form a subtopic portion 802, and indeed each are located in different subtopic portions 802A, 802B.

Returning to FIG. 4, process 400 may further comprise operation 404. In one embodiment, operation 404 may follow operation 403. Operation 404 comprises determining, for each interrogative sentence-level token 610, whether the interrogative sentence-level token 610 is substantially similar to a target query of a plurality of target queries. In various embodiments, the plurality of target queries describe queries deemed to be important, relevant, and representative of the conversation. Returning to the help center telephonic conversation example, target queries such as how can I help you, have I resolved your issue, is there anything else with which I can assist you, and/or the like, may be important, relevant, and representative of the help center telephonic conversation example as a whole. As such, various embodiments are configured to provide an extractive summarization based at least in part on the plurality of target queries, as described herein.

In various embodiments, a client computing entity 102 may provide a plurality of target queries in and/or with the input data object. For example, the client computing entity 102 transmits an API call comprising the input data object comprising the textual data and a plurality of target queries for which the client computing entity 102 desires an extract summarization. In other examples, the client computing entity 102 may otherwise transmit a plurality of target queries. In various embodiments, the extractive summarization system 101 (e.g., storage subsystem 108 and/or system computing entity 106) may store a plurality of target queries. For instance, a system computing entity 106 may store a plurality of target queries in memories 210, 215. A system computing entity 106 may store different pluralities of target queries for different client computing entities 102, and/or client computing entities 102 may be enabled to modified and configured the plurality of target queries. Likewise for instance, storage subsystem 108 may store a plurality of target queries.

In various embodiments, the plurality of target queries further comprises equivalent variants of each target query. While each target query may be specifically defined (e.g., comprising a certain combination of words in a certain sequence), various equivalent variants may express the same meaning. For instance, a target query of how can I help you may have equivalent variants of what can I do to help, how can I assist you today, can I help you today, and/or the like, which all convey the same general meaning of offering assistance and requesting specification on what assistance is needed. In various embodiments, the plurality of target queries comprises equivalent variants that are defined, configured, generated, and/or the like manually. For example, a client computing entity 102 may provide a plurality of target queries with equivalent variants. In other embodiments, the plurality of target queries comprises equivalent variants that are automatically determined or generated. For example, a target query may be analyzed, and certain words within the target query may be replaced with equivalent word variants (e.g., using an electronically-stored thesaurus model) to generate an equivalent variant of the target query.

Thus, in various embodiments, each interrogative sentence-level token 610 may be compared to the plurality of target queries, which may comprise equivalent variants, to determine whether each interrogative sentence-level token 610 is substantially similar to a target query (or an equivalent variant of a target query). In general, an interrogative sentence-level token 610 may be labelled identifying a specific target query (or equivalent variant) to which the interrogative sentence-level token 610 is substantially similar. In some instance, an interrogative sentence-level token 610 may not be substantially similar to any target queries and may be labelled as such (e.g., not substantially similar to any target queries).

In some embodiments, interrogative sentence-level tokens 610 are compared with the target queries using regular expression (RegEx)-based methods, operations, and/or techniques. For instance, the overall structure of an interrogative sentence-level token 610 is compared with the structure of a target query using regular expressions. For example, a target query how may I help you is structure with an interrogative word how followed by the words I and you. Thus, using a RegEx-based method, it may be determined that an interrogative sentence-level token how can I assist you is substantially similar to the example target query due to the interrogative sentence-level token beginning with an interrogative word how followed by the words I and you. In some embodiments, given a target query, "how can I help you", then some examples of RegEx would be "how can I help you" or "I help you". So, if the interrogative sentence in the particular conversation is "how may I help you", then using the RegEx, one may map the target query to the interrogative sentence. It may be possible to introduce the "don't care" string using the RegEx ".*", in that a RegEx pattern can be "how .* I help you" or the like.

In some embodiments, interrogative sentence-level tokens 610 are compared with target queries using distance-based similarity approaches. In such approaches, the interrogative sentence-level tokens 610 are compared to an individual target query. Each interrogative sentence-level token 610 is assigned a distance-based similarity score based at least in part on a word vector embedding model relative to the individual target query. If any of the interrogative sentence-level tokens 610 are assigned with a distance-based similarity score satisfying a threshold distance-based similarity score, such interrogative sentence-level tokens 610 are identified and/or labelled as being substantially similar to the individual target query. This technique may be applied repeatedly and/or in parallel for each target query of the plurality of target queries. In one embodiment, the distance-based similarity scores may be generated based at least in part on a Word Mover's Distance (WMD) similarity technique.

In other embodiments, distance-based similarity approaches may be applied to compare an interrogative sentence-level token 610 to a target query and its equivalent variants. Relative to an interrogative sentence-level token 610, distance-based similarity scores are generated for a target query and its equivalent variants. In one embodiment, the distance-based similarity scores may be generated based at least in part on a WMD similarity technique. Each of the distance-based similarity scores are compared to a threshold distance-based similarity score. In an embodiment, the threshold distance-based similarity score is 0.78. In various embodiments, the interrogative sentence-level token 610 is determined to be substantially similar to the target query if any of the distance-based similarity scores satisfy the threshold distance-based similarity score. For example, the highest distance-based similarity score may be compared to the threshold distance-based similarity score. As another example, the average distance-based similarity score may be compared to the threshold distance-based similarity score. This technique may then be applied repeatedly and/or in parallel for each interrogative sentence-level token 610.

In any case, one more interrogative sentence-level tokens 610 may be identified as being substantially similar to a target query (and/or equivalent variant) of the plurality of target queries. One of skill in the field to which the present disclosure pertains may imagine techniques other than the above described techniques to identify interrogative sentence-level tokens 610 as being substantially similar to a target query, and such techniques may be applied in various embodiments. As aforementioned, each identified interrogative sentence-level token may also be labelled to specify the target query with which an identified interrogative sentence-level token is substantially similar.

Thus, by determining and identifying certain interrogative sentence-level tokens 610 that are substantially similar to a target query, various embodiments of the present disclosure provide consistent and informative text-based summarizations of conversations. Summarizations may be generated for each of a plurality of conversations with the same set or plurality of target queries, thereby causing the summarizations to be consistent in informational focus across all conversations. As mentioned, target queries may also be intentionally pre-determined and/or selected such as to ensure summarizations are informative and include textual data that is important, relevant, and/or representative of a corresponding conversation.

Process 400 may further comprise operation 405. In one embodiment, operation 405 may follow operation 404. Operation 405 comprises, responsive to determining that a particular interrogative sentence-level token 610 is substantially similar to a target query, selecting one or more sentence-level tokens 502 in a subtopic portion of the particular interrogative sentence-level token 610. In various embodiments, operation 405 may be performed for each identified and/or labelled interrogative sentence-level token 610 subsequent to interrogative sentence-level tokens 610 throughout the textual data being identified and/or labelled. In various embodiments, the selected one or more sentence-level tokens 502 are located in the textual data after the particular interrogative sentence-level token 610 in the subtopic portion of the particular interrogative sentence-level token 610. The particular interrogative sentence-level token 610 in reference with or in the context of operation 405 is an interrogative sentence-level token 610 determined to be substantially similar to a target query and accordingly identified and/or labelled. In some instances, the selected one or more sentence-level tokens 502 includes an interrogative sentence-level token 610.

FIG. 9 provides an example embodiment of operation 405. That is, FIG. 9 provides operations for selecting one or more sentence-level tokens 502 in a subtopic portion of a particular interrogative sentence-level token 610, wherein the selected one or more sentence-level tokens 502 are located after the particular interrogative sentence-level token 610.

For instance, FIG. 9 provides operation 901, which comprises generating a first characterization score for each sentence-level token 502 occurring after a particular interrogative sentence-level token 610 in a subtopic portion 802 of the particular interrogative sentence-level token 610. As aforementioned, the particular interrogative sentence-level token 610 is an identified and/or labelled interrogative sentence-level token 610 and is located within one subtopic portion 802. It may be appreciated that, in most embodiments, at least one sentence-level token occurs after a particular interrogative sentence-level token 610 due to a subtopic portion 802 being composed of paragraph-level tokens delimited by interrogative sentence-level tokens 610.

In various embodiments, the first characterization score for a sentence-level token 502 is an information content score, or a score indicative of an information-based importance and/or informativeness of the sentence-level token 502. In some embodiments, the first characterization score is generated based at least on keyword ranking models, such as TextRank (a graph-based ranking model) and/or the like. In such models, a graph-based model or data structure is generated. The graph-based model or data structure includes a plurality of nodes each associated with a word described by different word-level token 504. Thus, the number of nodes in the graph-based model may correspond to the number of unique words in the textual data. Each node of the graph-based model is then assigned a node word score generated by the following equation:

$$S(V_i) = (1-d) + d \times \sum_{V_j \in adj(V_i)} \frac{w_{ij}}{\sum_{V_k \in adj(V_j)} w_{jk}} S(V_j),$$

where $V_i$ represents the $i^{th}$ node, $adj(V_i)$ denotes the adjacent nodes of $V_i$, $w_{ij}$ describes the pairwise similarity between the words associated with nodes $V_i$ and $V_j$, and d is a damping factor. In various embodiment, the damping factor is set to 0.85. The pairwise similarity between words may be determined by embedding each sentence-level token 502 into a low-dimensional vector space and computing pairwise cosine similarity values. In an embodiment, a sentence-level token 502 may be embedded into a low-dimensional vector space using word2vec techniques and/or the like.

Using the above equation, a first characterization score for a sentence-level token 502 may be generated based at least in part on evaluating the word-level tokens 504 of the sentence-level token 502. The first characterization score may specifically be generated by summing the node word scores for nodes in a path of the graph-based model associated with word-level tokens 504 of the sentence-level token 502. For example, a path in the graph-based model may be determined based at least in part on the word-level tokens 504 and the sequence in which they occur in the sentence-level token 502, and the graph traversal methods and operations may be performed to obtain and sum node word scores for nodes in the determined path. In various embodiments, the same graph-based model or data structure may be used to determine a first characterization score for each sentence-level token 502 in the subtopic portion 802 after the particular interrogative sentence-level token 610.

The example embodiment of operation 405 provided in FIG. 9 further comprises operation 902. In one embodiment, operation 902 may follow operation 901. Operation 902 comprises generating a second characterization score for each sentence-level token 502 occurring after a particular interrogative sentence-level token 610 in a subtopic portion 802 of the particular interrogative sentence-level token 610.

In various embodiments, the second characterization score for a sentence-level token 502 is a linguistic quality score, or a score indicative of the readability of the sentence-level token 502. A linguistic quality score may be generated based at least in part on an n-gram language model. Such n-gram language models are generally directed to predicting the next word in a sequence of words (e.g., a sentence) and may be applied herein to assign a probability to a sentence-level token 502. An assigned probability may be understood to be indicative of whether the sequence of word-level tokens 504 in a sentence-level token 502 is likely to appear in a typical text, thereby suggesting a measure of readability. For instance, a sentence-level token stating I would like to refill my prescription is more probable to appear in a typical text from the perspective of an n-gram language model as compared to a sentence-level token stating my prescription to refill I would like. Various embodiments may use a trigram language model specifically. The second characterization score may then be based at least in part on the assigned probability determined by the n-gram language model and may be specifically determined by the following equation:

$$LQ(Si) = \frac{1}{1 - LL(w_1, w_2, \ldots, w_n)},$$

where $LL(w_1, w_2, \ldots, w_n) = \frac{1}{L} \cdot \log n \prod_{t=3}^{q} P(w_t | w_{(t-1)}, w_{(t-2)}).$ FIG. 9 further provides operation 903, which comprises generating an aggregate characterization score for each sentence-level token based at least in part on the first characterization score and the second characterization score. In one embodiments, operation 903 may follow operation 902. In various embodiments, the aggregate characterization score for a sentence-level token 502 may be generated by multiplying the first characterization score and the second characterization score. In various embodiments, the first characterization score and the second characterization score may be normalized before being multiplied to generate an aggregate characterization score (e.g., in the range of 0 to 1).

In various embodiments, the example embodiment of operation 405 provided in FIG. 9 further comprises operation 904. In one embodiment, operation 904 follows operation 903. Operation 904 comprises selecting one or more sentence-level tokens 502 occurring in the subtopic portion 802 of a particular interrogative sentence-level token 610 after the particular interrogative sentence-level token 610 based at least in part on the aggregate characterization scores. In various embodiments, the sentence-level tokens 502 associated with a top number (e.g., which may be set in an application-specific manner) of aggregate characterization scores are selected. For example, three sentence-level tokens 502 associated with the three highest aggregate characterization scores are selected. In other embodiments, the sentence-level tokens 502 associated with a top percentile of aggregate characterization scores are selected.

Referring now to FIG. 10, an example table is provided illustrating the identification and selection of one or more sentence-level tokens 502 based at least in part on the aggregate characterization scores 1002. The example table lists each of the sentence-level tokens 502A-K occurring in the subtopic portion 802A (illustrated in FIG. 8) after the particular interrogative sentence-level token 610 stating How may I help you today (some textual data such as ok may have been removed during pre-processing and thus are not shown in the example table). Each of the sentence-level tokens 502A-K are associated with an aggregate characterization score 1002A-K.

As illustrated in the example table, three sentence-level tokens 502 associated with the three highest aggregate characterization scores 1002 recite respectively: hey matt, I'm calling to refill one of my prescriptions; I need to refill on my Lipitor, and I see here that I can refill that for you for 30 days supply (e.g., sentence-level tokens 502A, 502I, 502J). Due to each of these sentence-level tokens 502 having high aggregate characterization scores 1002, they may be selected and/or extracted for a summarization of the conversation. Specifically, the selected sentence-level tokens 502 may be selected, extracted, and subsequently associated with a target query substantially similar to the particular interrogative sentence-level token 610. In the illustrated example, the particular interrogative sentence-level token 610 recites How may I help you today, which has been identified as being substantially similar to a target query reciting How can I help you, and as such, the sentence-level tokens 502A, 502I, and 502J respectively reciting hey matt, I'm calling to refill one of my prescriptions; I need to refill on my Lipitor; and I see here that I can refill that for you for 30 days supply, are selected, extracted, and associated with the target query reciting How can I help you. In various embodiments, each sentence-level token 502 is associated with a conversation party (e.g., a first party 602, a second party 604); thus, for example, sentence-level token 502A may be identified as being associated with a first party 602, while sentence-level token 502J may be identified as being associated with a second party 604. Thus, one or more sentence-level tokens 502 are selected regardless or agnostic to which conversation party is associated with each sentence-level token. Thus, various embodiments of the present disclosure provide technical advantages by intelligently selecting textual data of the conversation that provide the most informativeness and quality for a text-based summarization of the conversation.

In various embodiments, sentence-level tokens 502 may be selected according to different techniques based at least in part on the target query substantially similar to the particular interrogative sentence-level token 610. For example, all the sentence-level tokens 502 in a subtopic portion 802 of a particular interrogative sentence-level token 610 substantially similar to a target query reciting Have I been able to resolve all your issues may be selected, due to an assumption that there may not be a significantly large number of sentence-level tokens 502 occurring after such a particular interrogative sentence-level token 610. The same may be done for a particular interrogative sentence-level token 610 substantially similar to a target query reciting Is there anything else I can help you with. Thus, the number of sentence-level tokens 502 selected may be determined based at least in part on the nature of a target query substantially similar to the particular interrogative sentence-level token 610, and/or the particular interrogative sentence-level token 610 itself.

Continuing with the above examples, sentence-level tokens 502 may not be selected or filtered for a target query reciting Have I been able to resolve your issues. For the target query, the sentence-level tokens 502 may be parsed or analyzed in search of the word "yes", and in the scenario that the word "yes" is detected, "yes" and/or the sentence-level token 502 comprising the word "yes" may be provided alternatively to all of the sentence-level tokens 502. The word "yes" may be searched for using a regular expression (RegEx) search operation. Similar techniques may be applied for other "yes or no" target queries. In various embodiments, the word "no" may be searched for and provided instead.

Returning to FIG. 4, process 400 may further comprise operation 406. Operation 406 comprises generating a summarization data object comprising the selected one or more sentence-level tokens 502 for each interrogative sentence-level token 610 determined to be substantially similar to a target query. In one embodiment, operation 406 may follow operation 405. For example, operation 406 may follow operation 904 of selecting sentence-level tokens 502 based at least in part on aggregate characterization scores 1002.

The summarization data object may comprise the plurality of target queries and provide the selected sentence-level tokens 502 in a format indicating the association of a selected sentence-level token 502 to a target query. As aforementioned, a selected sentence-level token 502 is selected with respect to a particular interrogative sentence-level token 610 determined to be substantially similar to a target query, and the selected sentence-level token 502 may be accordingly labelled. In various embodiments, the summarization data object may comprise the plurality of target queries and selected sentence-level tokens 502 such that each target query is provided with correspondingly labelled selected sentence-level tokens 502. As mentioned, certain target queries that are "yes or no" in nature (e.g., prompting a binary response) may be associated with either a "yes" or "no" instead of one or more selected sentence-level tokens 502.

The process 400 further comprises operation 407, which comprises performing one or more summarization-based actions on, with, and/or based at least in part on the summarization data object. In various embodiments, the one or more summarization-based actions comprise providing the summarization data object on a user interface (e.g., a display) of the system computing entity 106. For example, the one or more summarization-based actions comprises generating and/or executing computer executable instructions configured to cause the system computing entity 106 to provide the summarization-based actions on a specific physical display and/or display device. The summarization data object may be provided via a display in a text-based format and/or an image-based format, depending on the embodiment. For example, the summarization data object may be provided via a display in a word processing software application, enabling a user to modify and edit the summarization data object (e.g., via a user input such as a keyboard). For example, the summarization data object may be provided via a display as an image of the summarized text or in some non-modifiable or non-editable format. In various embodiments, the summarization data object is provided using a summary display user interface.

In various embodiments, the summarization data object is additionally or alternatively provided to or on a client computing entity 102. For example, the summarization data object is transmitted to a client computing entity 102. In some embodiments, the summarization data object is transmitted to a client computing entity 102 as a response to an API call comprising the input data object transmitted by the client computing entity 102. In various embodiments, the summarization data object is transmitted to the client computing entity 102 with instructions configured to cause the client computing entity 102 to display the summarization data object (e.g., via display 316).

In various embodiments, the one or more summarization-based actions comprise further processing the summarization data object. The summarization data object may be transmitted to another computing entity (e.g., another system computing entity 106, a client computing entity 102) for further processing.

Thus, by process 400, a summarization data object comprising a text-based summarization of a conversation is generated and provided. Accordingly, generating and providing the summarization data object, and the summarization data object itself, provide various technical advantages. Existing methods of summarizing a conversation are largely manual, inconsistent, unreliable, expensive, and time-consuming, while various methods, systems, operations, and/or the like described herein, such as process 400, provide an automated process for consistently generating and providing summarization data objects that are comprehensive in informativeness while maintaining conciseness. Furthermore, various embodiments provide unsupervised methods and systems for generating and providing summarization data objects. Thus, embodiments of the present disclosure include various technical improvements over existing methods for summarizing a conversation.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
receiving, by one or more processors, an input data object comprising textual data of a conversation, wherein the textual data comprises a plurality of sentence-level tokens;
generating, by the one or more processors, an interrogative classification for the plurality of sentence-level tokens based at least in part on one or more word-level tokens that respectively correspond to the plurality of sentence-level tokens, wherein generating the interrogative classification comprises indicating, from the plurality of sentence-level tokens, a first interrogative sentence-level token and a second interrogative sentence-level token;
identifying, by the one or more processors, a subtopic portion of the textual data based at least in part on a first location within the textual data and a second location within the textual data, wherein (i) the first location corresponds to the first interrogative sentence-level token, (ii) the second location occurs in the textual data before the second interrogative sentence-level token, and (iii) the subtopic portion comprises a portion of the plurality of sentence-level tokens and the first interrogative sentence-level token;
selecting, by the one or more processors, a sentence-level token from the portion of the plurality of sentence-level tokens in the subtopic portion, wherein the selecting is based at least in part on (i) a determination that a similarity score for the first interrogative sentence-level token and a target query of a plurality of target queries satisfies a threshold similarity score, and (ii) an aggregate characterization score based at least in part on (a) an informativeness score indicative of an informational value of the sentence-level token, and (b) a readability score indicative of a linguistic quality of the sentence-level token, wherein the readability score is based at least in part on one or more probabilities output by a language model;

generating, by the one or more processors, a summarization data object comprising the sentence-level token; and initiating, by the one or more processors, a performance of one or more summarization-based actions based at least in part on the summarization data object.

2. The computer-implemented method of claim 1, further comprising:
generating the aggregate characterization score for the sentence-level token by normalizing the informativeness score and the readability score of the sentence-level token; and
selecting the sentence-level token based at least in part on determining that the sentence-level token has a highest or lowest aggregate characterization score relative to other sentence-level tokens of the plurality of sentence-level tokens.

3. The computer-implemented method of claim 1, wherein the summarization data object comprises the plurality of target queries, wherein the target query of the plurality of target queries is provided with the sentence-level token.

4. The computer-implemented method of claim 1, wherein each target query of the plurality of target queries is associated with one or more equivalent variants.

5. The computer-implemented method of claim 1, wherein identifying the subtopic portion of the textual data comprises generating one or more paragraph-level tokens in the textual data, each paragraph-level token comprising at least one sentence-level token and beginning with an interrogative sentence-level token.

6. The computer-implemented method of claim 5, wherein the subtopic portion comprises the one or more paragraph-level tokens.

7. The computer-implemented method of claim 1, wherein the interrogative classification is generated and assigned to a sentence-level token based at least in part on providing one or more word-level tokens of the sentence-level token to a self-attention based bidirectional long short term memory (LSTM) model.

8. The computer-implemented method of claim 1, wherein receiving the input data object comprising the textual data comprises performing one or more pre-processing operations on the textual data to remove one or more word-level tokens describing stop words based at least in part on a configurable list of stop words.

9. The computer-implemented method of claim 1, wherein the textual data of the input data object is transcribed textual data from a telephonic conversation.

10. A system comprising one or more processors and at least one memory storing processor-executable instructions that, when executed by the one or more processors, cause the one or more processors to perform operations comprising:
receiving an input data object comprising textual data of a conversation, wherein the textual data comprises a plurality of sentence-level tokens;
generating an interrogative classification for the plurality of sentence-level tokens based at least in part on one or more word-level tokens that respectively correspond to the plurality of sentence-level tokens, wherein generating the interrogative classification comprises indicating, from the plurality of sentence-level tokens, a first interrogative sentence-level token and a second interrogative sentence-level token;
identifying a subtopic portion of the textual data based at least in part on a first location within the textual data and a second location within the textual data, wherein (i) the first location corresponds to the first interrogative sentence-level token, (ii) the second location occurs in the textual data before the second interrogative sentence-level token, and (iii) the subtopic portion comprises a portion of the plurality of sentence-level tokens and the first interrogative sentence-level token;
selecting a sentence-level token from the portion of the plurality of sentence-level tokens in the subtopic portion, wherein the selecting is based at least in part on (i) a determination that a similarity score for the first interrogative sentence-level token and a target query of a plurality of target queries satisfies a threshold similarity score, and (ii) an aggregate characterization score based at least in part on (a) an informativeness score indicative of an informational value of the sentence-level token, and (b) a readability score indicative of a linguistic quality of the sentence-level token, wherein the readability score is based at least in part on one or more probabilities output by a language model;
generating a summarization data object comprising the sentence-level token; and
initiating performance of one or more summarization-based actions based at least in part on the summarization data object.

11. The system of claim 10, wherein the operations further comprise:
generating the aggregate characterization score for the sentence-level token by normalizing the informativeness score and the readability score of the sentence-level token; and
selecting the sentence-level token based at least in part on determining that the sentence-level token has a highest or lowest aggregate characterization score relative to other sentence-level tokens of the plurality of sentence-level tokens.

12. The system of claim 10, wherein the summarization data object comprises the plurality of target queries, wherein the target query of the plurality of target queries is provided with the sentence-level token.

13. The system of claim 10, wherein each target query of the plurality of target queries is associated with one or more equivalent variants.

14. The system of claim 10, wherein identifying the subtopic portion of the textual data comprises generating one or more paragraph-level tokens in the textual data, each paragraph-level token comprising at least one sentence-level token and beginning with an interrogative sentence-level token.

15. The system of claim 14, wherein the subtopic portion comprises the one or more paragraph-level tokens.

16. The system of claim 10, wherein the interrogative classification is generated and assigned to a sentence-level token based at least in part on providing one or more word-level tokens of the sentence-level token to a self-attention based bidirectional long short term memory (LSTM) model.

17. The system of claim 10, wherein receiving the input data object comprising the textual data comprises performing one or more pre-processing operations on the textual data to remove one or more word-level tokens describing stop words based at least in part on a configurable list of stop words.

18. The system of claim 10, wherein the textual data of the input data object is transcribed textual data from a telephonic conversation.

19. One or more non-transitory computer-readable storage media storing processor-executable instructions that, when executed by one or more processors, cause the one or more processors to perform operations comprising:
  receiving an input data object comprising textual data of a conversation, wherein the textual data comprises a plurality of sentence-level tokens;
  generating an interrogative classification for the plurality of sentence-level tokens based at least in part on one or more word-level tokens that respectively correspond the plurality of sentence-level tokens, wherein generating the interrogative classification comprises indicating, from the plurality of sentence-level tokens, a first interrogative sentence-level token and a second interrogative sentence-level token;
  identifying a subtopic portion of the textual data based at least in part on a first location within the textual data and a second location within the textual data, wherein (i) the first location corresponds to the first interrogative sentence-level token, (ii) the second location occurs in the textual data before the second interrogative sentence-level token, and (iii) the subtopic portion comprises a portion of the plurality of sentence-level tokens and the first interrogative sentence-level token;
  selecting a sentence-level token from the portion of the plurality of sentence-level tokens in the subtopic portion, wherein the selecting is based at least in part on (i) a determination that a similarity score for the first interrogative sentence-level token and a target query of a plurality of target queries satisfies a threshold similarity score, and (ii) an aggregate characterization score based at least in part on (a) an informativeness score indicative of an informational value of the sentence-level token, and (b) a readability score indicative of a linguistic quality of the sentence-level token, wherein the readability score is based at least in part on one or more probabilities output by a language model;
  generating a summarization data object comprising the sentence-level token; and
  initiating performance of one or more summarization-based actions based at least in part on the summarization data object.

20. The one or more non-transitory computer-readable storage media of claim 19, wherein the interrogative classification is generated and assigned to a sentence-level token based at least in part on providing one or more word-level tokens of the sentence-level token to a self-attention based bidirectional long short term memory (LSTM) model.

* * * * *